United States Patent
Kondo et al.

(10) Patent No.: US 7,439,279 B2
(45) Date of Patent: *Oct. 21, 2008

(54) ACTIVE ENERGY RAY CURABLE COATING COMPOSITION AND MOLDED PRODUCT HAVING COATING FILM MADE OF CURED PRODUCT OF SAID COMPOSITION

(75) Inventors: Satoshi Kondo, Yokohama (JP);
Daisuke Shirakawa, Yokohama (JP);
Toshihiko Higuchi, Yokohama (JP);
Hirotsugu Yamamoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 447 days.

This patent is subject to a terminal disclaimer.

(21) Appl. No.: 11/128,384

(22) Filed: May 13, 2005

(65) Prior Publication Data

US 2005/0288385 A1 Dec. 29, 2005

Related U.S. Application Data

(63) Continuation of application No. PCT/JP03/14385, filed on Nov. 12, 2003.

(30) Foreign Application Priority Data

| Nov. 13, 2002 | (JP) | ............................... 2002-329119 |
| Nov. 25, 2002 | (JP) | ............................... 2002-340502 |
| Mar. 31, 2003 | (JP) | ............................... 2003-094994 |

(51) Int. Cl.
*C08F 2/46* (2006.01)
*C08J 3/28* (2006.01)

(52) U.S. Cl. ................. 522/156; 522/155; 522/71; 522/74; 522/77; 522/83; 522/90; 522/96; 522/134; 522/135; 522/136; 522/139; 522/140; 522/142; 522/144; 522/152; 522/163; 522/184; 522/185; 522/187; 428/411.1; 428/421; 428/422; 428/441; 428/442; 252/8.61; 252/8.62

(58) Field of Classification Search .............. 522/71; 522/74, 77, 83, 113, 114, 131, 132, 119, 522/120, 121, 155, 124, 156, 178, 179, 182, 522/184, 186, 187, 90, 96, 134, 135, 136, 522/139, 140, 142, 144, 152, 163, 185; 428/411.1, 428/421, 422, 441, 442; 252/8.61, 8.62; 427/508, 487, 490, 518

See application file for complete search history.

(56) References Cited

U.S. PATENT DOCUMENTS 6,833,393 B2 12/2004 Ishizeki et al.

2002/0111391 A1 8/2002 Ishizeki et al.

FOREIGN PATENT DOCUMENTS

| JP | 58-187414 | 11/1983 |
| JP | 61-76563 | 4/1986 |
| JP | 61-118467 | 6/1986 |
| JP | 61-258870 | 11/1986 |
| JP | 61-275365 | 12/1986 |
| JP | 62-48772 | 3/1987 |
| JP | 3-21910 | 1/1991 |
| JP | 3-153769 | 7/1991 |
| JP | 4-39317 | 2/1992 |
| JP | 7-292287 | 11/1995 |
| JP | 8-193107 | 7/1996 |
| JP | 10-60306 | 3/1998 |
| JP | 10-81839 | 3/1998 |
| JP | 10-245419 | 9/1998 |
| JP | 11-10767 | 1/1999 |
| JP | 11-060992 | 3/1999 |
| JP | 11-293159 | 10/1999 |
| JP | 2000-191668 | 7/2000 |
| JP | 2000-309725 | 11/2000 |
| JP | 2001-288216 | 10/2001 |
| JP | 2002-128845 | 5/2002 |
| JP | 2002-248703 | 9/2002 |
| JP | 2003-47908 | 2/2003 |
| JP | 2003-192749 | 7/2003 |
| JP | 2003-211586 | 7/2003 |

OTHER PUBLICATIONS

U.S. Appl. No. 11/128,384, filed May 13, 2005 Kondo, et al.
U.S. Appl. No. 11/130,262, filed May 17, 2005 Kondo, et al.
U.S. Appl. No. 11/131,280, filed May 18, 2005 Kondo, et al.

*Primary Examiner*—Sanza L McClendon
(74) *Attorney, Agent, or Firm*—Oblon, Spivak, McClelland, Maier & Neustadt, P.C.

(57) ABSTRACT

To provide a coating composition which forms a coating film having excellent fingerprint removability and having favorable abrasion resistance and transparency, and a molded product having a coating film made of a cured product of the composition.

An active energy ray curable coating composition comprising an active energy ray curable polymerizable monomer (A), a water and oil repellency-imparting agent (B) and an active energy ray polymerization initiator (C), wherein the water and oil repellency-imparting agent (B) contains a water and oil repellency-imparting agent (B-T) having a moiety (b-1) exerting water and oil repellency, an active energy ray curable functional group (b-2) and a moiety (b-3) excellent in compatibility with the polymerizable monomer (A) and a molded product having a coating film made of a cured product of the composition.

11 Claims, No Drawings

ACTIVE ENERGY RAY CURABLE COATING COMPOSITION AND MOLDED PRODUCT HAVING COATING FILM MADE OF CURED PRODUCT OF SAID COMPOSITION

BACKGROUND OF THE INVENTION

1. Filed of the Invention

The present invention relates to an active energy ray curable coating composition which is to be cured by irradiation with active energy rays to provide a transparent coating film having favorable abrasion resistance and excellent stain resistance against grease stains, particularly excellent removability of fingerprints attached to its surface. Further, the present invention relates to a molded product comprising a glass or plastic substrate and a coating film made of a cured product of the coating composition formed on the surface of the substrate, having excellent abrasion resistance and stain resistance against grease stains over a long period, particularly excellent fingerprint removability.

2. Discussion of Background

To mirror-finished metal plates, or inorganic glass show windows, showcases, opening materials of automobiles, anti-reflection films, optical filters, optical lenses, liquid crystal displays, CRT displays, projection televisions, plasma displays, EL displays, optical disks, etc., grease stains such as fingerprints, sebum, sweat and cosmetics are likely to attach depending upon their environment in many cases. Such grease stains once attached are hardly removed, and particularly on optical members equipped with an antireflection film, the attached stains stand out and are thereby problematic. As a means to solve such a problem due to attachment of grease stain, various techniques have been proposed to form a stain resistant layer having such a function that grease stains are less likely to be attached thereto, and even if they are attached, they are likely to be wiped off, on the surface of an optical member. In an optical member having a stain resistant layer on its surface, the stain resistant layer located as the outermost layer is likely to be scarred when the stains are wiped off.

In JP-A-2002-248703, a coating composition having a silicone compound or a fluorine-containing compound added as a lubricity-imparting agent so as to impart abrasion resistance and lubricity to a cured product layer of a molded product with a coating, is used. However, the silicone compound or the fluorine-containing compound as disclosed in the above publication has a low affinity with a matrix resin, and thus it is likely to bleed out from the surface of the matrix resin when the composition is coated, thus impairing transparency at a coated portion. Further, addition of a silicone compound as a lubricity-imparting agent can not provide adequate stain resistance.

JP-A-11-293159 discloses a hard coating agent for an optical recording medium containing a fluorine type surfactant. However, a hard coat layer containing the fluorine type surfactant is insufficient in abrasion resistance, and in order to impart stain resistance, two kinds of fluorine type surfactants, i.e. a crosslinked fluorine type surfactant and a non-crosslinked fluorine type surfactant, are required.

JP-A-2000-191668 discloses a stain resistant composition containing a fluorine-containing compound having an alkoxysilane structure at its terminal by means of a carbamate linkage and fine particles of an inorganic compound or an organic compound. However, adhesive properties of the stain resistant composition are attributable to linkage of an alkoxysilane contained in the composition to a layer comprising an inorganic compound such as silicon dioxide, and thus when no inorganic compound layer is present on the substrate surface, even if stain resistance may be temporarily obtained, no long-term stain resistance can be obtained. Further, the stain resistant composition also has only stain resistance but has no mechanical strength, and its surface is relatively likely to be scarred. Accordingly, in a case where it is required to impart mechanical strength such as abrasion resistance to the substrate surface, it is required to provide a hard coat layer on the substrate surface, which makes the process complicated.

SUMMARY OF THE INVENTION

The present invention is to solve the above problems of prior art, and it is an object of the present invention to provide a coating composition from which a transparent coating film having favorable abrasion resistance and excellent stain resistance against grease stains, particularly excellent long-term fingerprint removability, can be formed on the surface of various substrates to be coated, particularly a glass metal or plastic substrate. Further, it is an object of the present invention to provide a molded product comprising a glass or plastic substrate and a coating film made of a cured product of a coating composition formed on the outermost surface of the substrate.

The present invention provides an active energy ray curable coating composition comprising 100 parts by mass of an active energy ray curable polymerizable monomer (A), from 0.01 to 10 parts by mass of a water and oil repellency-imparting agent (B) and from 0.1 to 10 parts by mass of an active energy ray polymerization initiator (C), wherein the polymerizable monomer (A) contains at least 20 mass % of a polyfunctional polymerizable monomer (a-1) having at least two polymerizable functional groups selected from the group consisting of an acryloyl group and a methacryloyl group in one molecule, in the total mass of the polymerizable monomer (A) contained in the coating composition, and the water and oil repellency-imparting agent (B) contains a water and oil repellency-imparting agent (B-T) having a moiety (b-1) exerting water and oil repellency, an active energy ray curable functional group (b-2) and a moiety (b-3) made of at least one portion selected from the group consisting of portions represented by the following formulae (1) to (4):

—R³—    Formula (1)

—(CH₂CH₂O)ₓ—    Formula (2)

—(CH₂CH(CH₃)O)ᵧ—    Formula (3)

—(C(=O)CᵤH₂ᵤO)ₜ—    Formula (4)

wherein $R^3$ is a $C_{6-20}$ alkylene group, each of x and y is an integer of from 5 to 100, u is an integer of from 3 to 5, and t is an integer of from 1 to 20.

In the first coating composition of the present invention, the water and oil repellency-imparting agent (B-T) has moderate compatibility with other components in the composition, and thus when the composition is coated on the substrate surface, the water and oil repellency-imparting agent (B-T) segregates on the surface of the coating film without impairing transparency of the coating film before curing. When the composition is cured by irradiation with active energy rays, the active energy ray curable functional group in the water and oil repellency-imparting agent (B-T) is bonded to the resin matrix and fixed in the composition, and accordingly the surface of the coating film made of a cured product of the composition is excellent in water and oil repellency, and maintains excellent fingerprint removability over a long period.

In the water and oil repellency-imparting agent (B-T), the moiety (b-1) exerting water and oil repellency preferably has at least one portion selected from the group consisting of portions represented by the following formulae (5) to (9):

$$C_kF_{2k+1}— \quad \text{Formula (5)}$$

$$—(CF_2CF_2O)_p— \quad \text{Formula (6)}$$

$$—(CF_2CF(CF_3)O)_q— \quad \text{Formula (7)}$$

$$—(CF_2CF_2CF_2O)_r— \quad \text{Formula (8)}$$

$$—(CF_2O)_s— \quad \text{Formula (9)}$$

wherein k is an integer of from 1 to 16, and each of p, q, r and s is an integer of from 1 to 100.

Further, in the water and oil repellency-imparting agent (B-T), the moiety (b-1) exerting water and oil repellency preferably has a portion represented by the following formula (10) or (11):

$$R^f(OC_3F_6)_n—O—(CF_2)_m—(CH_2)_L—O— \quad \text{Formula (10)}$$

wherein $R^f$ is a $C_{1-16}$ polyfluoroalkyl group (including one having an oxygen atom), n is an integer of from 1 to 50, each of m and L is an integer of from 0 to 3, and $6 \geq m+L>0$;

$$R^f(OC_2F_4)_e—O—(CF_2)_g—(CH_2)_h—O— \quad \text{Formula (11)}$$

wherein $R^f$ is a $C_{1-16}$ polyfluoroalkyl group (including one having an oxygen atom), e is an integer of from 1 to 50, each of g and h is an integer of from 0 to 3, and $6 \geq g+h>0$.

It is preferred that the coating composition of the present invention further contains from 0.1 to 500 parts by mass of a colloidal silica (D) per 100 parts by mass of the polymerizable monomer (A).

It is preferred that the colloidal silica (D) is a modified colloidal silica obtained by surface modification with a mercapto group-containing silane compound (S1) wherein an organic group having a mercapto group, and a hydrolysable group or a hydroxyl group, are bonded to a silicon atom, or with a (meth)acryloyl group-containing silane compound (S2) wherein an organic group having a (meta)acryloyl group, and a hydrolysable group or a hydroxyl group, and bonded to a silicon atom.

The mercapto group-containing silane compound (S1) is preferably a compound represented by the following formula (12):

$$HS—R^1—SiR^2{}_fR^5{}_{3-f} \quad \text{Formula (12)}$$

wherein $R^1$ is a bivalent hydrocarbon group, $R^2$ is a hydroxyl group or a hydrolysable group, $R^5$ is a monovalent hydrocarbon group, and f is an integer of from 1 to 3.

The (meth)acryloyl group-containing silane compound (S2) is preferably a compound represented by the following formula (13):

$$CH_2=C(R^6)—R^7—SiR^2{}_fR^5{}_{3-f} \quad \text{Formula (13)}$$

wherein $R^6$ is a hydrogen atom or a methyl group, $R^7$ is a bivalent hydrocarbon group, $R^2$ is a hydroxyl group or a hydrolysable group, $R^5$ is a monovalent hydrocarbon group, and f is an integer of from 1 to 3.

Further, the present invention provides an active energy ray curable coating composition, which forms a coating film by curing, wherein the contact angle relative to oleic acid on the surface of the coating film after curing is at least 60 degree initially and at least 55 degree after a moisture resistance test, the haze of the coating film after curing is at most 3%, and the change in the haze of the coating film after curing between before and after Taber abrasion test (abrasive wheels: CS-10F, load on one wheel: 500 g, 500 cycles) as defined by ISO9352 is at most 10%.

The second coating composition of the present invention provides a coating film the surface of which after curing is excellent in water and oil repellency, and the excellent water and oil repellency is maintained over a long period. Further, the coating film after curing is excellent also in transparency and abrasion resistance.

The coating composition preferably contains an active energy ray curable polymerizable monomer (A).

The coating composition which provides a coating film having the above characteristics after curing is preferably a coating composition containing the above (A), (B) and (C).

Further, the present invention provides a molded product which comprises a glass or plastic substrate and a coating film with a thickness of from 0.1 μm to 50 μm, made of a cured product of the above coating composition formed on the surface of the substrate.

DETAILED DESCRIPTION OF THE PREFERRED EMBODIMENTS

The first coating composition of the present invention (hereinafter referred to simply as "first coating composition") is an active energy ray curable coating composition comprising 100 parts by mass of an active energy ray curable polymerizable monomer (A), from 0.01 to 10 parts by mass of a water and oil repellency-imparting agent (B) and from 0.1 to 10 parts by mass of an active energy ray polymerization initiator (C).

In the first coating composition, the active energy ray curable polymerizable monomer (A) (hereinafter sometimes referred to as a polymerizable monomer (A)) is a monomer which undergoes polymerization by irradiation with active energy rays in the presence of the active energy ray polymerization initiator (C) as mentioned hereinafter, and specifically, it generically represents a polyfunctional polymerizable monomer (a-1) having at least two acryloyl groups or methacryloyl groups as polymerizable functional groups in one molecule (hereinafter sometimes referred to as monomer (a-1)), and another polymerizable monomer represented by a monofunctional polymerizable monomer (a-2) as mentioned hereinafter. However, it does not include a compound corresponding to the water and oil repellency-imparting agent (B) as mentioned hereinafter. In the following explanation, an acryloyl group and a methacryloyl group are generically referred to as a (meth)acryloyl group.

In the first coating composition, the monomer (a-1) corresponds to the polyfunctional compound (a) disclosed in paragraphs 0013 to 0052 of JP-A-10-81839. Namely, it is a polyfunctional polymerizable monomer having at least two (meth)acryloyl groups in one molecule as polymerizable functional groups capable of being polymerized by active energy rays.

In the first coating composition, the monomer (a-1) is preferably one having at least three polymerizable functional groups in its molecule, wherein the molecular weight per functional group is at most 120, with a view to developing high degree abrasion resistance. The following compounds may be mentioned as the monomer (a-1) which satisfies such conditions.

A polyfunctional compound which is a polyester as a reaction product of pentaerythritol or polypentaerythritol and (meth)acrylic acid, and which has at least 3, more preferably from 4 to 20 (meth)acryloyl groups. Specifically, trimethylolpropane tri(meth)acrylate, pentaerythritol tri(meth)acrylate, pentaerythritol tetra(meth)acrylate, dipentaerythritol hexa(meth)acrylate and the like are preferably mentioned.

On the other hand, a (meth)acryloyl group-containing compound having a urethane bond in its molecule (hereinafter referred to as an acrylic urethane) may be preferably used since the urethane bond functions as a pseudo crosslinking site by the action of the hydrogen bond, and sufficiently high degree abrasion resistance can be developed even when the molecular weight per functional group is not so small as above. The following compounds are preferred as the monomer (a-1) which satisfies such conditions.

A polyfunctional compound which is an acrylic urethane as a reaction product of pentaerythritol or polypentaerythritol, polyisocyanate and hydroxyalkyl (meth)acrylate, and which has at least 3, more preferably from 4 to 20 (meth) acryloyl groups.

A polyfunctional compound which is an acrylic urethane as a reaction product of a hydroxyl group-containing poly(meth)acrylate of pentaerythritol or polypentaerythritol, and polyisocyanate, and which has at least 3, more preferably from 4 to 20 (meth)acryloyl groups.

The first coating composition may contain a polymerizable monomer other than the monomer (a-1), as the polymerizable monomer (A). The polymerizable monomer (A) other than the monomer (a-1) may be a monofunctional polymerizable monomer having one (meth)acryloyl group in one molecule (hereinafter sometimes referred to as monomer (a-2) or a compound having at least one polymerizable functional group other than a (meth)acryloyl group. However, a compound having a polymerizable functional group other than a (meth)acryloyl group is not sufficient in curing properties by active energy rays in many cases, and is hardly available, and thus the polymerizable monomer (A) other than the monomer (a-1) is preferably the monomer (a-2).

The monomer (a-2) may, for example, be alkyl (meth) acrylate represented by a formula $CH_2=C(R^4)COOC_zH_{2z+1}$ (wherein $R^4$ is a hydrogen atom or a methyl group, and z is an integer of from 1 to 13, provided that $C_zH_{2z+1}$ may have a straight chain structure or a branched structure), allyl (meth) acrylate, benzyl (meth)acrylate butoxyethyl (meth)acrylate, butanediol (meth)acrylate, butoxytriethylene glycol mono (meth)acrylate, t-butylaminoethyl (meth)acrylate, 3-chloro-2-hydroxypropyl (meth)acrylate, 2-cyanoethyl (meth)acrylate, cyclohexyl (meth)acrylate, 2,3-dibromopropyl (meth) acrylate, dicyclopentenyl (meth)acrylate, N,N-diethylaminoethyl (meth)acrylate, N,N-dimethylaminoethyl (meth)acrylate, 2-ethoxyethyl (meth)acrylate, 2-(2-ethoxyethoxy)ethyl (meth)acrylate, 2-ethylhexyl (meth)acrylate, glycerol (meth)acrylate, glycidyl (meth)acrylate, heptadecafluorodecyl (meth)acrylate, 2-hydroxyethyl (meth)acrylate, 2-hydroxy-3-(meth)acryloyloxypropyltrimethylammonium chloride, 2-hydroxypropyl (meth)acrylate, γ-(meth)acryloxypropyltrimethoxysilane, 2-methoxyethyl (meth)acrylate, methoxydiethylene glycol (meth)acrylate, methoxytriethylene glycol (meth)acrylate, methoxytetraethylene glycol (meth)acrylate, methoxydipropylene glycol (meth)acrylate, methoxylated cyclodecatriene (meth)acrylate, morpholine (meth)acrylate, nonylphenoxypolyethylene glycol (meth) acrylate, nonylphenoxypolypropylene glycol (meth)acrylate, octafluoropentyl (meth)acrylate, phenoxyhydroxypropyl (meth)acrylate, phenoxyethyl (meth)acrylate, phenoxydiethylene glycol (meth)acrylate, phenoxytetraethylene glycol (meth)acrylate, phenoxyhexaethylene glycol (meth)acrylate, phenoxy (meth)acrylate, polypropylene glycol (meth)acrylate, sodium 2-sulfonate ethoxy (meth)acrylate, tetrafluoropropyl (meth)acrylate, tetrahydrofurfuryl (meth)acrylate, trifluoroethyl (meth)acrylate, vinyl acetate, N-vinyl caprolactam, N-vinylpyrrolidone, dicyclopentadienyl (meth) acrylate or isobornylacrylate, In the total mass of the polymerizable monomer (A) contained in the first coating composition, the monomer (a-1) is from 20 to 100 mass %. When the proportion of the monomer (a-1) in the polymerizable monomer (A) contained in the first coating composition is within this range, the coating film made of a cured product of the first coating composition (hereinafter sometimes referred to as a coating film after curing) will be excellent in abrasion resistance. The proportion of the monomer (a-1) is more preferably from 50 to 100 mass %, particularly preferably from 70 to 100 mass %.

In the first coating composition, the water and oil repellency-imparting agent (B) generically represents a water and oil repellency-imparting agent (B-T) as explained below and another water and oil repellency-imparting agent as mentioned hereinafter. The coating composition of the present invention contains such a water and oil repellency-imparting agent (B) in an amount of from 0.01 to 10 parts by mass, preferably from 0.1 to 5.0 parts by mass, per 100 parts by mass of the polymerizable monomer (A). When the amount of the water and oil repellency-imparting agent (B) is within this range, the coating film after curing will be excellent in water and oil repellency and abrasion resistance. If the amount of the water and oil repellency-imparting agent (B) is less than 0.01 part by mass, the coating film after curing tends to be poor in water and oil repellency. On the other hand, if the amount of the water and oil repellency-imparting agent (B) exceeds 10 parts by mass, the coating film after curing tends to be plasticized and have decreased abrasion resistance, and tends to be poor in transparency.

The water and oil repellency-imparting agent (B-T) is a compound having a moiety (b-1) exerting water and oil repellency, an active energy ray curable functional group (b-2) and a moiety (b-3) made of at least one portion selected from the group consisting of portions represented by the following formulae (1) to (4) in one molecule:

  Formula (1)

  Formula (2)

  Formula (3)

  Formula (4)

wherein $R^3$ is a $C_{6-20}$ alkylene group, each of x and y is an integer of from 5 to 100, u is an integer of from 3 to 5, and t is an integer of from 1 to 20.

In the water and oil repellency-imparting agent (B-T), the moiety (b-1) exerting water and oil repellency (hereinafter sometimes referred to as moiety (b-1)) means a moiety comprising a fluorine-containing organic group of a fluorine-containing compound which is generally used as a water repellent or an oil repellent (such as a homopolymer of a polymerizable monomer containing a polyfluoroalkyl group such as a (meth)acrylate containing a polyfluoroalkyl group, or a copolymer of such a monomer with another polymerizable monomer such as an acrylate, maleic anhydride, chloroprene, butadiene or methyl vinyl ketone, a fluorinated polyether compound or a fluorosilicone compound).

In the water and oil repellency-imparting agent (B-T), the moiety (b-1) preferably has at least one portion selected from the group consisting of portions represented by the following formulae (5) to (9):

$$C_kF_{2k+1}— \quad \text{Formula (5)}$$

$$—(CF_2CF_2O)_p— \quad \text{Formula (6)}$$

$$(CF_2CF(CF_3)O)_q— \quad \text{Formula (7)}$$

$$—(CF_2CF_2CF_2O)_r— \quad \text{Formula (8)}$$

$$—(CF_2O)_s— \quad \text{Formula (9)}$$

wherein k is an integer of from 1 to 16, and each of p, q, r and s is an integer of from 1 to 100.

The portion of the above formula (5) is a perfluoroalkyl group, and k representing the carbon number is preferably from 1 to 16. When the carbon number is within this range, the crystallinity of the group tends to be weak, and transparency of the coating film after curing will not be impaired.

The portion of the above formula (6) represents a unit of tetrafluoroethylene oxide, each of the portions of the formulae (7) and (8) represents a unit of hexafluoropropylene oxide, and the portion of the formula (9) represents a unit of difluoromethylene. Each of p, q, r and s representing the degree of polymerization is preferably at most 100. When each of p, q, r and s is within the above range, the surface of the coating film after curing will be excellent in water and oil repellency, and excellent fingerprint removability will be maintained over a long period. Each of p, q, r and s is more preferably an integer of from 1 to 80.

In the water and oil repellency-imparting agent (B-T), the moiety (b-1) may have any one of the portions of the above formulae (5) to (9) or may have at least two types in the same molecule.

In the water and oil repellency-imparting agent (B-T), the moiety (b-1) preferably has a portion represented by the following formula (10):

$$R^f(OC_3F_6)_n—O—(CF_2)_m—(CH_2)_L—O— \quad \text{Formula (10)}$$

wherein $R^f$ is a $C_{1-16}$ polyfluoroalkyl group (including one having an oxygen atom), n is an integer of from 1 to 50, and each of m and L is an integer of from 0 to 3, provided that they satisfy the following relational expression:

$6 \geq m+L > 0$

In the formula (10), $OC_3F_6$ represents $OCF_2CF_2CF_2$ or $OCF(CF_3)CF_2$.

The polyfluoroalkyl ($R^f$) group is a group having two or more hydrogen atoms in an alkyl group substituted by fluorine atoms. The $R^f$ group preferably has a straight chain structure, but may have a branched structure, and when it has a branched structure, it is preferred that the branched portion is present at the terminal of the $R^f$ group, and the terminal is a short chain with a carbon number of from 1 to 4.

The carbon number of the $R^f$ group is preferably from 1 to 8. When the carbon number of the $R^f$ group is within this range, the crystallinity of the $R^f$ group tends to be relatively weak, and the coating film after curing will be excellent in transparency.

The $R^f$ group may contain another halogen atom other than fluorine atoms. Said another halogen atom is preferably a chlorine atom. Further, between the carbon-carbon linkage in the $R^f$ group, an etheric oxygen atom, an ester linkage, a sulfonamide group or a thioetheric sulfur atom may be present.

The number of fluorine atoms in the $R^f$ group, as represented by {(number of fluorine atoms in $R^f$ group)/(number of hydrogen atoms contained in a corresponding alkyl group having the same carbon number as the $R^f$ group)}×100 (%), is preferably at least 60%, particularly preferably at least 80%.

Further, the $R^f$ group is preferably a group having all hydrogen atoms in an alkyl group substituted by fluorine atoms (i.e. a perfluoroalkyl group) or a group having a perfluoroalkyl group at its terminal.

The following groups may be mentioned as specific examples of the $R^f$ group:

$CF_3—$, $C_2F_5—$, $C_3F_7—$ (including structural isomeric groups such as $CF_3(CF_2)_2—$ and $(CF_3)_2CF—$), $C_4F_9—$ (including structural isomeric groups such as $CF_3(CF_2)_3—$, $(CF_3)_2CFCF_2—$, $(CF_3)_3C—$ and $CF_3CF_2(CF_3)CF—$), $C_5F_{11}—$ (such as $CF_3(CF_2)_4—$) $C_6F_{13}—$ (such as $CF_3(CF_2)_5—$), $C_7F_{15}—$ (such as $CF_3(CF_2)_6—$), $C_8F_{17}—$ (such as $CF_3(CF_2)_7—$), $C_9F_{19}—$ (such as $CF_3(CF_2)_8—$) $C_{10}F_{21}—$ (such as $CF_3(CF_2)_9—$), $C_{12}F_{25}—$ (such as $CF_3(CF_2)_{11}—$) $C_{14}F_{29}—$ (such as $CF_3(CF_2)_{13}—$, $C_{16}F_{33}—$ (such as $CF_3(CF_2)_{15}—$) $Cl(CF_2)_v—$, $H(CF_2)_v—$ (v is an integer of from 1 to 16), $(CF_3)_2CF(CF_2)_w—$ (w is an integer of from 1 to 13) and the like.

The following groups may be mentioned as specific examples of the $R^f$ group which is a group having an etheric oxygen atom, an ester linkage, a sulfonamide group or a thioetheric sulfur atom between the carbon-carbon linkage:

$CF_3(CF_2)_4OCF(CF_3)—$, $F[CF(CF_3)CF_2O]_GCF(CF_3)CF_2CF_2—$, $F[CF(CF_3)CF_2O]_HCF(CF_3)—$, $F[CF(CF_3)CF_2O]_HCF_2CF_2—$, $F(CF_2CF_2CF_2O)_HCF_2CF_2—$, $F(CF_2CF_2O)_HCF_2CF_2—$, $F(CF_2)_5SCF(CF_3)—$, $F[CF(CF_3)CF_2S]_GCF(CF_3)CF_2CF_2—$, $F[CF(CF_3)CF_2S]_HCF(CF_3)—$, $F[CF(CF_3)CF_2S]_HCF_2CF_2—$, $F(CF_2CF_2CF_2S)_HCF_2CF_2—$, $F(CF_2CF_2S)_JCF_2CF_2—$ wherein G is an integer of from 1 to 3, H is an integer of from 1 to 4, and J is an integer of from 1 to 7.

In the first coating composition, among the above exemplified $R^f$ groups, $CF_3—$, $C_2F_5—$ or $C_3F_7—$ is preferred. When the $R^f$ group is such a group, a material is easily available to prepare the moiety of the formula (10), and preparation of this moiety is also easy.

Further, in the water and oil repellency-imparting agent (B-T), the moiety (b-1) preferably has a portion represented by the following formula (11):

$$R^f(OC_2F_4)_e—O—(CF_2)_g—(CH_2)_h—O— \quad \text{Formula (11)}$$

wherein $R^f$ is a $C_{1-16}$ polyfluoroalkyl group (including one having an oxygen atom), e is an integer of from 1 to 50, and each of g and h is an integer of from 0 to 3, provided that they satisfy the following relational repression:

$6 \geq g+h > 0$.

$R^f$ in the formula (11) is the same as $R^f$ as explained for the formula (10).

Further, in the first coating composition, as the water and oil repellency-imparting agent (B-T), a plural types of water and oil repellency-imparting agents (B-T) having different moieties (b-1) may be used in combination.

In the water and oil repellency-imparting agent (B-T), the active energy ray curable functional group (b-2) (hereinafter sometimes referred to as functional group (b-2)) may be a functional group having radical reactivity, and specifically, a (meth)acryloyl group, an allyl group, a vinyl group, a vinyl ether group, a halogen group or a mercapto group may, for example, be preferably mentioned. A (meth)acryloyl group is particularly preferred in view of the radical reactivity and the stability of the chemical bond to be formed.

Since the water and oil repellency-imparting agent (B-T) has the functional group (b-2), when the first coating composition is cured by irradiation with active energy rays, the functional group (b-2) also undergoes curing reaction and is covalently bonded to the polymerizable monomer (A) constituting the resin component in the first coating composition. Thus, the water and oil repellency-imparting agent (B-T) is bonded to a cured product of the first coating composition, i.e. the coating film after curing, by means of a the covalent bond. Thus, the water and oil repellency-imparting agent (B-T) is present as fixed on the surface of the coating film. Therefore, the water and oil repellency-imparting agent (B-T) will not volatilize from the surface of the coating film. Further, since the water and oil repellency-imparting agent (B-T) is bonded to the coating film, the surface of the coating film after curing maintains excellent water and oil repellency over a long period, and excellent fingerprint removability will be maintained over a long period.

The water and oil repellency-imparting agent (B-T) may have, as the functional group (b-2), any one of the above exemplified functional groups, or may have two or more types of functional groups in the same molecule. Further, in the first coating composition, as the water and oil repellency-imparting agent (B-T), a plural types of water and oil repellency-imparting agents (B-T) having different functional groups (b-2) may be used in combination.

In the water and oil repellency-imparting agent (B-T), the moiety (b-3) having at least one portion selected from the group consisting of portions represented by the formulae (1) to (4) (hereinafter sometimes referred to as moiety (b-3)) has a function to exert compatibility with the polymerizable monomer (A):

  Formula (1)

  Formula (2)

  Formula (3)

  Formula (4)

wherein $R^3$ is a $C_{6-20}$ alkylene group, each of x and y is an integer of from 5 to 100, u is an integer of from 3 to 5, and t is an integer of from 1 to 20.

The moiety (b-1) exerting water and oil repellency in the water and oil repellency-imparting agent (B-T) has a low affinity with a resin matrix formed from the polymerizable monomer (A), and thus when the coating composition is cured, the water and oil repellency-imparting agent (B-T) is likely to bleed out on the surface of the resin matrix, thus impairing transparency of the coating film after curing.

The water and oil repellency-imparting agent (B-T) having a moiety (b-3) excellent in compatibility with the polymerizable monomer (A) has moderate compatibility with the polymerizable monomer (A) even when a moiety (b-1) having a low affinity with the polymerizable monomer (A) is selected.

In the first coating composition, the water and oil repellency-imparting agent (B-T) has moderate compatibility with the polymerizable monomer (A), and thus when the first coating composition is coated on the substrate surface, the water and oil repellency-imparting agent (B-T) segregates on the surface of the coating film without impairing transparency of the coating film before curing. Thus, transparency of the coating film after curing will not be impaired.

The portion of the above formula (1) is a straight chain or branched alkylene group having a carbon number of from 6 to 20. When the carbon number is within this range, the compatibility of the water and oil repellency-imparting agent (B-T) with the polymerizable monomer (A) tends to be moderate, and further, the crystallinity of the group tends to be relatively weak, and thus transparency of the coating film after curing and the water and oil repellency of the coating film surface tend to be excellent, and excellent fingerprint removability will be maintained over a long period. If the carbon number is at most 5, the compatibility with the polymerizable monomer (A) tends to be low, thus impairing transparency of the coating film before curing. This means that the transparency of the coating film after curing will be impaired. On the other hand, if the carbon number exceeds 20, the crystallinity of the group tends to be strong, and the transparency of the coating film after curing will be impaired also.

The portion of the above formula (2) represents a unit of ethylene oxide. x representing the degree of polymerization is from 5 to 100, preferably from 5 to 80. When x is within this range, the water and oil repellency-imparting agent (B-T) has moderate compatibility with the polymerizable monomer (A), and thus transparency of the coating film after curing and the water and oil repellency of the coating film surface tend to be excellent, and excellent fingerprint removability will be maintained over a long period. When x is at most 4, the compatibility of the water and oil repellency-imparting agent (B-T) tends to be low, thus impairing the transparency of the coating film after curing. On the other hand, if x exceeds 100, the compatibility of the water and oil repellency-imparting agent (B-T) tends to be too high, and the water and oil repellency-imparting agent (B-T) will hardly segregate on the surface of the coating film, and thus the coating film after curing will not have sufficient water and oil repellency.

The portion of the above formula (3) represents a unit of propylene oxide. y representing the degree of polymerization is from 5 to 100, preferably from 5 to 80. When y is within this range, the water and oil repellency-imparting agent (B-T) has moderate compatibility with the polymerizable monomer (A), and thus the transparency of the coating film after curing and the water and oil repellency on the coating film surface tend to be excellent, and excellent fingerprint removability will be maintained over a long period. When y is at most 4, the compatibility of the water and oil repellency-imparting agent (B-T) tends to be low, thus impairing transparency of the coating film after curing. On the other hand, if y exceeds 100, the compatibility of the water and oil repellency-imparting agent (B-T) tends to be too high, and the water and oil repellency-imparting agent (B-T) will hardly segregate on the coating film surface, and thus the coating film after curing will not have sufficient water and oil repellency.

The portion of the above formula (4) represents a unit obtained from a ring-opened product from lactone. The carbon number of the group is preferably from 3 to 5 in view of availability. Further, t representing the degree of polymerization is preferably at most 20. When t is within the above range, the crystallinity of the group will not be too strong, and the coating film after curing tends to be excellent in transparency.

The water and oil repellency-imparting agent (B-T) may have, as the moiety (b-3), any one of the portions of the above formulae (1) to (4), or may have two or more types of the portions in the same molecule. Further, in the first coating composition, as the water and oil repellency-imparting agent (B-T), a plural types of water and oil repellency-imparting agents (B-T) having different moieties (b-3) may be used in combination.

In the water and oil repellency-imparting agent (B-T), the boding form of the respective moieties is not particularly limited. As the bonding form of the respective moieties in the water and oil repellency-imparting agent (B-T), specifically, the following examples may be preferably mentioned.

1. Straight chain type: a type wherein the moiety (b-1), the moiety (b-3) and the functional group (b-2) are linearly connected. Hereinafter referred to as straight chain type.

With respect to the straight chain type, the raw material compound forming the moiety (b-1) is preferably a compound having the moiety (b-1) and having its terminal modified with a hydroxyl group. For example, one having the terminal of the moiety of the above formula (10) or (11) modified with a hydroxyl group, or polyhexafluoropropylene oxide having its terminal modified with a hydroxyl group, may be preferably mentioned.

By polymerizing a monomer such as ethylene oxide, propylene oxide or lactone as the moiety (b-3) to the terminal hydroxyl group of the compound having the moiety (b-1) and having its terminal modified with a hydroxyl group, the moiety (b-3) can be constituted adjacently to the moiety (b-1). Otherwise, a polymer such as polyethylene glycol or polypropylene glycol as the moiety (b-3) may be connected to the moiety (b-1) by means of a urethane bond using e.g. a bifunctional isocyanate. Here, depending upon the chemical structure of the raw material compound forming the moiety (b-1), the acidity of the terminal hydroxyl group tends to be too high, and polymerization of the monomer such as ethylene oxide, propylene oxide or lactone may not smoothly proceed in some cases. In such a case, ethylene carbonate may be added while decarboxylating it in the presence of a catalyst to insert one unit of ethylene oxide so as to decrease the acidity of the terminal hydroxyl group, and then the monomer such as ethylene oxide, propylene oxide or lactone is polymerized to constitute the moiety (b-3).

By the operation so far, the terminal of the moiety (b-3) is a hydroxyl group. Thus, as a method of introducing the functional group (b-2) (such as a (meth)acryloyl group), a method of introducing it by means of an ester linkage using e.g. (meth)acrylic acid or (meth)acrylic acid chloride, a method of introducing it by means of a urethane bond using 2-isocyanatoethyl (meth)acrylate, or a method of introducing e.g. 2-hydroxyethyl (meth)acrylate, 3-hydroxypropyl (meth)acrylate or 4-hydroxybutyl (meth)acrylate by a urethane bond by means of a bifunctional isocyanate may, for example, be preferably mentioned.

Further, a method may also be preferably mentioned wherein one having one terminal of a polymer such as polyethylene glycol or polypropylene glycol already modified with a (meth)acryloyl group, is used and bonded to the hydroxyl group at the terminal of the moiety (b-1) by means of a urethane bond using e.g. a bifunctional isocyanate to connect the moiety (b-3) and the functional group (b-2) in this order adjacently to the moiety (b-1) all at once.

2. Copolymerization type: a radical polymerizable macromer having the moiety (b-1) and a radical polymerizable macromer having the moiety (b-3) may be prepared, and such macromers are copolymerized. The functional group (b-2) is further introduced to the obtained copolymer. Hereinafter referred to as copolymerization type.

As the macromer having the moiety (b-1), specifically, one having the terminal of the portion of the above formula (10) or (11) modified with a (meth)acryloyl group, or a fluorinated alkyl ester of (meth)acrylic acid may, for example, be preferably mentioned.

As the macromer having the moiety (b-3), one having one terminal of a polymer such as polyethylene glycol or polypropylene glycol modified with a (meth)acryloyl group, or one having one terminal of an alkyl ester of (meth)acrylic acid or a ring-opened polymer of lactone modified with a (meth)acryloyl group, may, for example, be preferably mentioned.

The functional group (b-2) may be introduced to the terminal of the copolymer of the above two macromers. For example, a method of introducing it to a hydroxyl group at one terminal at which no (meth)acryloyl group is added of the above two macromers, by means of an ester linkage using e.g. (meth)acrylic acid or (meth)acrylic acid chloride, or a method of introducing it by means of a urethane bond using 2-isocyanatoethyl (meth)acrylate, may, for example, be preferably mentioned.

Otherwise, a method wherein the above two macromers and 2-hydroxyethyl (meth)acrylate, 3-hydroxypropyl (meth)acrylate, 4-hydroxybutyl (meth)acrylate or the like are copolymerized, and then the functional group (b-2) is introduced by means of an ester linkage using e.g. (meth)acrylic acid or (meth)acrylic acid chloride, or a method of introducing it using 2-isocyanatoethyl (meth)acrylate, may also be mentioned.

In either of the above straight chain type and copolymerization type, the functional group (b-2) is bonded preferably adjacently to the moiety (b-3). When the functional group (b-2) is bonded adjacently to the moiety (b-3), the surface migration characteristics of the moiety (b-1) tend to be high, and the surface of the coating film after curing tends to be excellent in water and oil repellency, as compared with a case where the functional group (b-2) is bonded adjacently to the moiety (b-1).

The water and oil repellency-imparting agent (B) may contain a known water and oil repellency-imparting agent other than the above water and oil repellency-imparting agent (B-T). Such a known water and oil repellency-imparting agent may, for example, be a fluorine type water and oil repellency-imparting agent using e.g. a fluororesin of e.g. tetrafluoroethylene or vinylidene fluoride, or a fluorine compound having a perfluoroalkyl group, a silicone type water and oil repellency-imparting agent using an organopolysiloxane having a siloxane bond in its main chain and having an alkyl group such as a methyl group, an ethyl group or a propyl group or a fluoroalkyl group in its side chain, a wax type water and oil repellency-imparting agent using e.g. bees wax or paraffin, or a metal salt type water and oil repellency-imparting agent using a salt of zirconium and a fatty acid, or a salt of aluminum and a fatty acid. However, the known water and oil repellency-imparting agent in the present specification does not include compounds corresponding to the above water and oil repellency-imparting agent (B-T). When such a known water and oil repellency-imparting agent is contained, it is contained preferably in an amount of at most 30 parts by mass per 100 parts by mass of the total mass of the water and oil repellency-imparting agent (B).

The first coating composition contains, in addition to the above constituents, from 0.1 to 10 parts by mass of an active energy ray polymerization initiator (C) per 100 parts by mass of the polymerizable monomer (A). When the amount of the active energy ray polymerization initiator (C) is within this range, curing properties will be sufficient, and all the active energy ray polymerization initiator (C) will decompose at the time of curing.

The active energy ray polymerization initiator (C) widely includes known photopolymerization initiators.

Specifically, the known photopolymerization initiator may, for example, be an aryl ketone type photopolymerization initiator (such as an acetophenone, a benzophenone, an alkylaminobenzophenone, a benzyl, a benzoin, a benzoin ether, a benzoin dimethyl ketal, a benzoyl benzoate or an $\alpha$-acyloxime ester), a sulfur-containing photopolymerization initiator (such as a sulfide or a thioxanthone), an acylphosphine oxide (such as an acyldiarylphosphine oxide) or other photopolymerization initiators. The photopolymerization initiator may be used as a mixture of at least two types thereof in combination. Further, the photopolymerization initiator may be used in combination with a photosensitizer such as an amine. The following compounds may be mentioned as specific photopolymerization initiators, however, the photopolymerization initiator is not limited thereto.

4-Phenoxydichloroacetophenone, 4-t-butyl-dichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methyl-propan-1-one, 1-hydroxycyclohexylphenylketone and 2-methyl-1-{4-(methylthio)phenyl}-2-morpholinopropan-1-one.

Benzyl, benzoin, benzoin methyl ether, benzoin ethyl ether, benzoin isopropyl ether, benzoin isobutyl ether, benzyl dimethyl ketal, benzophenone, benzoyl benzoate, methyl benzoyl benzoate, 4-phenylbenzophenone, hydroxybenzophenone, benzophenone acrylate, 3,3'-dimethyl-4-methoxybenzophenone, 3,3',4,4'-tetrakis(t-butylperoxycarbonyl) benzophenone, 9,10-phenanthrenequinone, camphorquinone, dibenzosuberone, 2-ethylanthraquinone, 4',4''-diethylisophthalophenone, (1-phenyl-1,2-propanedione-2(o-ethoxycarbonyl)oxime), $\alpha$-acyloxime ester and methyl phenyl glyoxylate.

4-Benzoyl-4'-methyldiphenyl sulfide, thioxanthone, 2-chlorothioxanthone, 2-methylthioxanthone, 2,4-dimethylthioxanthone, isopropylthioxantone, 2,4-dichlorothioxanthone, 2,4-diethylthioxanthone, 2,4-diisopropylthioxantone, 2,4,6-trimethylbenzoyl diphenylphosphine oxide, benzoyl diphenylphosphine oxide, 2,6-dimethylbenzoyl diphenylphosphine oxide and bis(2,6-dimethoxybenzoyl)-2,4,4-trimethylpentylphosphine oxide.

The first coating composition may contain, as the case requires, at least one functional compounding agent selected from the group consisting of an ultraviolet absorber, a photostabilizer, an antioxidant, a thermal polymerization inhibitor, a leveling agent, a defoaming agent, a thicker, a sedimentation-preventing agent, a pigment (organic coloring pigment, inorganic pigment), a coloring dye, an infrared absorber, a fluorescent brighter, a dispersant, electroconductive fine particles, an antistatic agent, an anti-fogging agent and a coupling agent.

The ultraviolet absorber is preferably a benzotriazole ultraviolet absorber, a benzophenone ultraviolet absorber, a salicylic acid ultraviolet absorber, a phenyltriazine ultraviolet absorber or the like, which is commonly used as an ultraviolet absorber for a synthetic resin. Specifically, the compounds disclosed in paragraph 0078 of JP-A-11-268196 may be mentioned. As the first coating composition contains a polyfunctional polymerizable monomer (a-1), particularly preferred is one having a photopolymerizable functional group in its molecule, such as 2-{2-hydroxy-5-(2-acryloyloxyethyl) phenyl}benzotriazole or 2-hydroxy-3-methacryloyloxypropyl-3-(3-benzotriazole-4-hydroxy-5-t-butylphenyl) propionate.

The photostabilizer is preferably a hindered amine photostabilizer which is commonly used as a photostabilizer for a synthetic resin. Specifically, the compounds disclosed in paragraph 0080 of JP-A-268196, may be mentioned. In the present invention, one having a polymerizable functional group in its molecule such as N-methyl-4-methacryloyloxy-2,2,6,6-tetramethylpiperidine is particularly preferred.

The antioxidant may, for example, be a hindered phenol antioxidant such as 2,6-di-t-butyl-p-cresol or a phosphorus type antioxidant such as triphenylphosphite. The thermal polymerization initiator may, for example, be hydroquinone monomethyl ether. Further, the leveling agent may, for example, be a silicone resin leveling agent or an acryl resin leveling agent.

The defoaming agent may, for example, be a silicone resin defoaming agent such as polydimethylsiloxane. The thickener may, for example, be a polymethyl methacrylate polymer, a hydrogenated castor oil compound or a fatty acid amide compound.

The organic coloring pigment may, for example, be a condensed polycyclic organic pigment or a phthalocyanine organic pigment. The inorganic pigment may, for example, be titanium dioxide, cobalt oxide, molybdenum red or titanium black. Further, the coloring dye may, for example, be an organic solvent-soluble azo metal complex salt dye or an organic solvent-soluble phthalocyanine dye.

The infrared absorber may, for example, be a polymethine, phthalocyanine, metal complex, aminium, diimonium, anthraquinone, dithiol metal complex, naphthoquinone, indole phenol, azo or triarylmethane compound.

The electroconductive fine particles may, for example, be a metal powder of zinc, aluminum, nickel, etc, iron phosphide or antimony doped tin oxide.

The antistatic agent may, for example, be a nonionic antistatic agent, a cationic antistatic agent or an anionic antistatic agent.

The coupling agent may, for example, be a silane coupling agent or a titanate coupling agent.

Further, a colloidal silica (D) may be blended with the first coating composition for the purpose of further improving abrasion resistance of the coating film after curing. The colloidal silica (D) is ultrafine particles of silicic anhydride dispersed in a dispersion medium in the form of colloid. The dispersion medium is not particularly limited, and preferably water, an lower alcohol, a cellosolve or the like. Specifically, the dispersion medium may, for example, be water, methanol, ethanol, isopropyl alcohol, n-butanol, ethylene glycol, methyl cellosolve, ethyl cellosolve, butyl cellosolve, propylene glycol monomethyl ether acetate, dimethylacetamide, toluene, xylene, methyl acetate, ethyl acetate, pentyl acetate or acetone.

The average particle size of the colloidal silica (D) is not particularly limited, but is preferably from 1 to 1,000 nm, particularly preferably from 1 to 200 nm, especially preferably from 1 to 50 nm, so as to obtain high transparency of the coating film after curing.

Further, in order to improve dispersion stability of the colloidal silica (D), the surface of the particles may be modified with a hydrolyzate of a hydrolysable silane compound. Here, "the surface is modified with a hydrolyzate" means such a state that a hydrolyzate of a silane compound is physically or chemically bonded to a part of or the entire silanol groups on the surface of the colloidal silica particles, whereby the surface characteristics are improved. Silica particles, to the surface of which a hydrolyzate which further undergoes a condensation reaction is similarly bonded, are also included. This surface modification can easily be carried out by subjecting a part of or the entire hydrolysable groups of the silane compound to hydrolysis or to hydrolysis and a condensation reaction in the presence of the silica particles.

The hydrolysable silane compound is preferably a silane compound wherein an organic group having a functional group such as a (meth)acryloyl group, an amino group, an epoxy group or a mercapto group, and a hydrolysable group such as an alkoxy group or a hydroxyl group, are bonded to a silicon atom. The hydrolysable group in the present specification means a group which may be hydrolyzed at the bonding portion with the silicon atom. Preferably, it may, for example, be 3-(meth)acryloyloxypropyltrimethoxysilane, 2-(meth)acryloyloxyethyltrimethoxysilane, 3-(meth)acryloyloxypropyltriethoxysilane, 2-(meth)acryloyloxyethyltriethoxysilane, 3-aminopropyltriethoxysilane, 3-aminopropyltrimethoxysilane, N-(2-aminoethyl)-3-aminopropylmethyldimethoxysilane, 3-glycidoxypropyltrimethoxysilane or 3-mercaptopropyltrimethoxysilane.

The hydrolysable silane compound is preferably a mercapto group-containing silane compound (S1) wherein an organic group having a mercapto group, and a hydrolysable group or a hydroxyl group, are bonded to a silicon atom, in view of high reactivity with the polymerizable monomer (A). The mercapto group-containing silane compound (S1) is preferably a compound represented by the following formula (12):

$$HS-R^1-SiR^2_fR^5_{3-f}$$  Formula (12)

wherein $R^1$ is a bivalent hydrocarbon group, $R^2$ is a hydroxyl group or a hydrolysable group, $R^5$ is a monovalent hydrocarbon group, and f is an integer of from 1 to 3.

In the formula (12), $R^1$ is preferably a $C_{2-6}$ alkylene group, particularly preferably a $C_3$ alkylene group. $R^5$ is preferably an alkyl group having a carbon number of at most 4, particularly preferably a methyl group or an ethyl group. $R^2$ is preferably a hydrolysable group, more preferably a halogen group or an alkoxy group having a carbon number of at most 4, particularly preferably an alkoxy group having a carbon number of at most 4. The halogen is preferably chlorine or bromine. The alkoxy group is more preferably a methoxy group or an ethoxy group in view of favorable hydrolysability. f is preferably 2 or 3.

Typical examples of the mercapto group-containing silane compound represented by the formula (12) are shown below. Here, OMe represents a methoxy group, OEt represents an ethoxy group, and OPr represents a n-propoxy group.

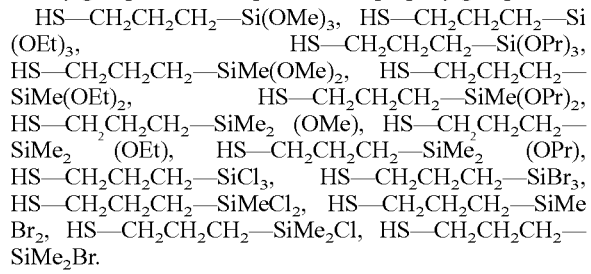

HS—CH$_2$CH$_2$CH$_2$—Si(OMe)$_3$, HS—CH$_2$CH$_2$CH$_2$—Si(OEt)$_3$, HS—CH$_2$CH$_2$CH$_2$—Si(OPr)$_3$, HS—CH$_2$CH$_2$CH$_2$—SiMe(OMe)$_2$, HS—CH$_2$CH$_2$CH$_2$—SiMe(OEt)$_2$, HS—CH$_2$CH$_2$CH$_2$—SiMe(OPr)$_2$, HS—CH$_2$CH$_2$CH$_2$—SiMe$_2$ (OMe), HS—CH$_2$CH$_2$CH$_2$—SiMe$_2$ (OEt), HS—CH$_2$CH$_2$CH$_2$—SiMe$_2$ (OPr), HS—CH$_2$CH$_2$CH$_2$—SiCl$_3$, HS—CH$_2$CH$_2$CH$_2$—SiBr$_3$, HS—CH$_2$CH$_2$CH$_2$—SiMeCl$_2$, HS—CH$_2$CH$_2$CH$_2$—SiMeBr$_2$, HS—CH$_2$CH$_2$CH$_2$—SiMe$_2$Cl, HS—CH$_2$CH$_2$CH$_2$—SiMe$_2$Br.

Further, the hydrolysable silane compound is preferably a (meth)acryloyl group-containing silane compound (S2) wherein an organic group having a (meth)acryloyl group, and a hydrolysable group or a hydroxyl group, are bonded to a silicon atom, in view of high reactivity with the polymerizable monomer (A) and the stability of the bond. The (meth)acryloyl group-containing silane compound (S2) is preferably a compound represented by the following formula (13):

$$CH_2=C(R^6)-R^7-SiR^2_fR^5_{3-f}$$  Formula (13)

wherein $R^6$ is a hydrogen atom or a methyl group, $R^7$ is a bivalent hydrocarbon group, $R^2$ is a hydroxyl group or a hydrolysable group, $R^5$ is a monovalent hydrocarbon group, and f is an integer of from 1 to 3.

In the formula (13), $R^1$ is preferably a $C_{2-6}$ alkylene group, particularly preferably a $C_3$ alkylene group. $R^5$ is preferably an alkyl group having a carbon number of at most 4, particularly preferably a methyl group or an ethyl group. $R^2$ is preferably a hydrolysable group, more preferably a halogen group or an alkoxy group having a carbon number of at most 4, particularly preferably an alkoxy group having a carbon number of at most 4. The halogen is preferably chlorine or bromine. The alkoxy group is more preferably a methoxy group or an ethoxy group in view of favorable hydrolysability. f is preferably 2 or 3.

Typical examples of the (meth)acryloyl group-containing silane compound (S2) represented by the above formula are shown below.

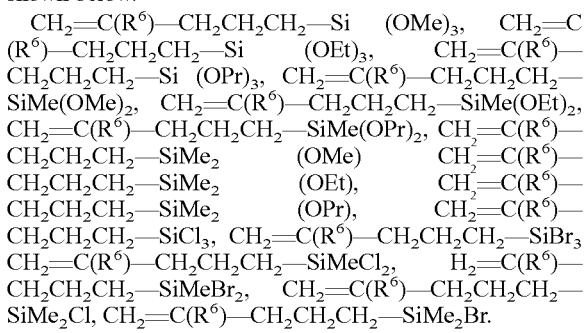

CH$_2$=C(R$^6$)—CH$_2$CH$_2$CH$_2$—Si(OMe)$_3$, CH$_2$=C(R$^6$)—CH$_2$CH$_2$CH$_2$—Si(OEt)$_3$, CH$_2$=C(R$^6$)—CH$_2$CH$_2$CH$_2$—Si(OPr)$_3$, CH$_2$=C(R$^6$)—CH$_2$CH$_2$CH$_2$—SiMe(OMe)$_2$, CH$_2$=C(R$^6$)—CH$_2$CH$_2$CH$_2$—SiMe(OEt)$_2$, CH$_2$=C(R$^6$)—CH$_2$CH$_2$CH$_2$—SiMe(OPr)$_2$, CH$_2$=C(R$^6$)—CH$_2$CH$_2$CH$_2$—SiMe$_2$ (OMe), CH$_2$=C(R$^6$)—CH$_2$CH$_2$CH$_2$—SiMe$_2$ (OEt), CH$_2$=C(R$^6$)—CH$_2$CH$_2$CH$_2$—SiMe$_2$ (OPr), CH$_2$=C(R$^6$)—CH$_2$CH$_2$CH$_2$—SiCl$_3$, CH$_2$=C(R$^6$)—CH$_2$CH$_2$CH$_2$—SiBr$_3$, CH$_2$=C(R$^6$)—CH$_2$CH$_2$CH$_2$—SiMeCl$_2$, H$_2$=C(R$^6$)—CH$_2$CH$_2$CH$_2$—SiMeBr$_2$, CH$_2$=C(R$^6$)—CH$_2$CH$_2$CH$_2$—SiMe$_2$Cl, CH$_2$=C(R$^6$)—CH$_2$CH$_2$CH$_2$—SiMe$_2$Br.

In a case where the colloidal silica (D) is blended, the blending amount (solid content) is preferably at least 0.1 part by mass and at most 500 parts by mass, more preferably at least 1 part by mass and at most 300 parts by mass, particularly preferably at least 10 parts by mass and at most 200 parts by mass, per 100 parts by mass of the polymerizable monomer (A). When the blending amount is within this range, the coating film after curing tends to have sufficient abrasion resistance, haze is less likely to occur on it, and cracks or the like due to an external force are less likely to occur on it.

Further, an organic solvent may be blended with the first coating composition for the purpose of improving the coating properties and the adhesive properties to the substrate surface of the coating composition. The organic solvent is not particularly limited so long as it has no problem in solubility of the polymerizable monomer (A), the water and oil repellency-imparting agent (B), the active energy ray polymerization initiator (C), the colloidal silica (D) and other additives, and it may be any solvent which satisfies the above performances. Further, two or more types of organic solvents may be used in combination. The amount of the organic solvent used is preferably at most 100 times, particularly preferably at most 50 times, the amount of the polymerizable monomer (A) by mass.

Preferably, the organic solvent may, for example, be an organic solvent such as a lower alcohol such as ethyl alcohol, butyl alcohol or isopropyl alcohol, a ketone such as methyl isobutyl ketone, methyl ethyl ketone or acetone, an ether such as dioxane, diethylene glycol dimethyl ether, tetrahydrofuran or methyl-t-butyl-ether, or a cellosolve such as methyl cellosolve, ethyl cellosolve, butyl cellosolve or propylene glycol monomethyl ether acetate. Further, an ester such as n-butyl acetate, isoamyl acetate or diethylene glycol monoacetate, a halogenated hydrocarbon such as a $C_{5-12}$ perfluoroaliphatic hydrocarbon such as polyfluorohexane, polyfluoromethylcyclohexane or polyfluoro-1,3-dimethylcyclohexane, a polyfluoroaromatic hydrocarbon such as bis(trifluoromethyl)benzene, or a polyfluoroaliphatic hydrocarbon, or a hydrocarbon such as toluene, xylene or hexane may, for example, be used. Such an organic solvent may be used as a mixture of two or more types thereof in combination.

In a case where an organic solvent is contained in the first coating composition, it is preferred to select a proper organic solvent in accordance with the type of the substrate on which a coating film is formed. For example, when the substrate is made of an aromatic polycarbonate resin having low solvent resistance, it is preferred to use a solvent providing a low solubility to the aromatic polycarbonate resin, and a lower alcohol, a cellosolve, an ester, an ether or a mixture thereof is appropriate.

The first coating composition is coated on a glass or plastic substrate by a method such as dip coating, spin coating, flow coating, spraying, bar coating, gravure coating, roll coating, blade coating or air knife coating, and dried in the case where the composition contains an organic solvent, and then irradiated with active energy rays and cured.

The active energy rays may, for example, be preferably ultraviolet rays, electron rays, X-rays, radioactive rays or high frequency waves. Ultraviolet rays having a wavelength of from 180 to 500 nm are particularly preferred from economical viewpoint.

As an active energy ray source, an ultraviolet ray irradiation apparatus such as a xenon lamp, a low-pressure mercury lamp, a high-pressure mercury lamp, a superhigh-pressure mercury lamp, a metal halide lamp, a carbon arc lamp or a tungsten lamp, an electron ray irradiation apparatus, an X-ray irradiation apparatus, a high frequency wave generation apparatus or the like may be used.

The active energy ray irradiation period may optionally be changed depending upon conditions such as the type of the polymerizable monomer (A), the type of the active energy ray polymerization initiator (C), the thickness of the coating film and the active energy ray source. Usually the object is achieved by irradiation for 0.1 to 60 seconds. Further, for the purpose of completing the curing reaction, a heat treatment may be carried out after irradiation with active energy rays.

The thickness of the coating film may be variously changed as required. Usually a coating film with a thickness of from 0.1 to 50 μm is preferred, and particularly a coating film with a thickness of from 0.2 to 20 μm is preferred. When the thickness of the coating film is within this range, the abrasion resistance tends to be sufficient, and the deep portion of the coating film will be sufficiently cured. The most preferred thickness of the coating film is from 0.3 to 10 μm.

The coating film after curing has favorable transparency, and its surface is excellent in abrasion resistance and water and oil repellency, and maintains excellent fingerprint removability over a long period. Thus, the coating film is excellent in stain resistance against grease stains such as fingerprint, sebum, sweat and cosmetics. Such grease stains are less likely to be attached, and even if attached, they are easily be wiped off.

The reason why the coating film after curing of the first coating composition has excellent fingerprint removability is considered as follows.

One usually called fingerprints (hereinafter referred to as "fingerprints") to be attached to the surface of e.g. an optical member is sweat and sebum components on the fingertip attached to the surface with transcribing the pattern of the fingerprints.

It is considered that the surface of the coating film after curing is excellent in water and oil repellency, and thus even when "fingerprints" are attached to the surface of the coating film, the surface of the coating film repels moisture and sebum components contained in the "fingerprints", and the "fingerprints" do not adhere to the surface of the coating film, and spherical moisture and sebum components are put on the surface of the coating film. Accordingly, the sebum components and the like can easily be wiped off. The coating film is considered to be excellent in fingerprint removability accordingly.

The second coating composition of the present invention (hereinafter referred to as "second coating composition") is an active energy ray curable coating composition which forms a coating film when cured, and is characterized by having the following characteristics.

A contact angle relative to oleic acid on the surface of the coating film after curing of at least 60 degree initially and at least 55 degree after a moisture resistance test.

A haze of the coating film after curing of at most 3%.

A change in the haze of the coating film after curing of at most 10%, between before and after Taber abrasion test (abrasive wheels: CS-10F, load on one wheel: 500 g, 500 cycles) as defined by ISO9352.

The second coating composition has the above characteristics, and thus the surface of the coating film after curing is excellent in water and oil repellency, and the excellent water and oil repellency is maintained over a long period. In the present invention, as the index of the water and oil repellency, the contact angle relative to a droplet (specifically, a droplet of each of water and oleic acid) put on the surface of the coating film after curing, is employed. Of the second coating composition, the contact angle on the surface of the coating film after curing, as measured by procedure shown in Examples as mentioned hereinafter, is as follows.

Contact Angle on the Surface of the Coating Film After Curing

Water: at least 85 degree, preferably at least 90 degree, more preferably at least 95 degree (initially), at least 80 degree (after moisture resistance test)

Oleic acid: 60 degree, preferably at least 65 degree, more preferably at least 70 degree (initially), at least 55 degree (after moisture resistance test)

Further, the second coating composition has the above characteristics, and thus the coating film after curing is excellent also in transparency.

In the present invention, as the index of the transparency of the coating film after curing, the haze is employed. The haze of the coating film after curing of the second coating composition is defined by the haze of a coating film with a thickness of 1.2 μm formed on a polycarbonate substrate with a thickness of 3 mm. Of the second coating composition, the haze of the coating film after curing is at most 3%, preferably at most 1%, more preferably at most 0.5%.

Further, the second coating composition has the above characteristics, and thus the surface of the coating film after curing is excellent also in abrasion resistance. In the present invention, as the index of the abrasion resistance of the surface of the coating film after curing, the change in the haze of the coating film between before and after Taber abrasion test (abrasive wheels CS-10F, load on one wheel: 500 g, 500 cycles) as defined by ISO9352 is used. Of the second coating composition, the change in the haze of the coating film after curing is at most 10%, preferably at most 8%, more preferably at most 6%.

The second coating composition has the above characteristics, and thus the surface of the coating film after curing is excellent also in surface lubricity. In the present invention, as the index of the surface lubricity on the surface of the coating film after curing, the coefficient of dynamic friction on the surface of the coating film as measured in accordance with procedure shown in Examples as mentioned hereinafter, is used. Specifically, of the second coating composition, the initial coefficient of dynamic friction and the coefficient of dynamic friction after the moisture resistance test of the film after curing, are both at most 0.1.

Here, the second coating composition is an active energy ray curable type coating composition, and widely includes ones having the above characteristics.

The second coating composition preferably contains the above-described active energy ray curable polymerizable monomer (A), i.e. the polyfunctional polymerizable monomer (a-1) and/or the monofunctional polymerizable monomer (a-2), etc. The content of (a-1) in the polymerizable monomer (A) may be optional, but is preferably from 20 to 100 mass %, more preferably from 40 to 100 mass %, particularly preferably from 70 to 100 mass %, to the total mass of the polymerizable monomer (A).

Particularly preferred embodiment of the second coating composition is the above first coating composition.

The first and second coating compositions of the present invention are applied to the surface of a glass or plastic substrate to be used as an optical member, and form a cured coating film having excellent transparency, abrasion resistance and water and oil repellency and maintaining excellent fingerprint removability over a long period.

The material of the plastic substrate on which a coating film is formed, is preferably a plastic material having transparency or a plastic material being poor in abrasion resistance, and specifically, it may, for example, be an aromatic polycarbonate resin, a polymethyl methacrylate resin, a polymethacrylimide resin, a polystyrene resin, a polyvinyl chloride resin, an unsaturated polyester resin, a polyolefin resin, an ABS resin or a MS (methyl methacrylate/styrene) resin.

EXAMPLES

Now, the present invention will be explained with reference to Examples of the present invention (Examples 1 to 3, 5 to 8, 11, 13 and 15 to 18) and Comparatives Examples (Examples 4, 9, 10, 12, 14 and 19), however, the present invention is not limited thereto. In each Example, measurement and evaluation of various physical properties were carried out by the following methods, and the results are shown in Table 4. As a substrate, a transparent sheet made of an aromatic polycarbonate resin with a thickness of 3 mm (100 mm×100 mm) was used.

Contact Angle

Using an automatic contact angle meter (DSA10D02: manufactured by KRUSS, Germany), a droplet of 3 μL was formed on the needlepoint in a dry state (20° C., relative humidity 65%), which was brought into contact with the surface of a sample coating film to form a droplet. The contact angle is an angle formed by the tangent to the liquid surface at a point where a solid and a liquid are in contact, and the solid surface, and defined as the angle at the side containing the liquid. As the liquid, each of distilled water and oleic acid was used. Further, the contact angle was measured with respect to an initial sample and a sample after a moisture resistance test (stored in a humid environment at 60° C. with a relative humidity of 95% for 500 hours).

Fingerprint Removability

The fingerprints attached to the surface of a sample coating film were wiped off by a non-woven fabric made of cellulose (BEMCOT M-3, manufactured by Asahi Kasei Corporation), and the removability was visually judged. Evaluation was carried out with respective to an initial sample and a sample after a moisture resistance test (stored in a humid environment at 60° C. at a relative humidity of 95% for 500 hours).

The evaluation standard were as follows:
◯: Fingerprint completely removable.
X: Fingerprint not removable.

Transparency

The haze (%) on four points of a sample coating film was measured by a haze meter, and the average (initial haze) was calculated.

Abrasion Resistance

In accordance with Taber abrasion test as defined by ISO9352, two CS-10F abrasive wheels were respectively combined with a weight of 500 g and put on a sample coating film, and rotated 500 cycles. The haze after the abrasion test was measured by a haze meter. The measurement of the haze was carried out at four points on the cycle orbit of the abrasive wheels, and an average was calculated. The abrasion resistance was represented by the value (%) of (haze after abrasion test)-(initial haze).

Surface Lubricity

The coefficient of dynamic friction on the surface of a sample coating film was measured with respect to the above initial sample and sample after a moisture resistance test. The coefficient of dynamic friction was obtained by measuring the weight (g) of a sliding piece required to horizontally move the load, and represented by "the weight/load".

Test pad: non-woven fabric made of cellulose (BEMCOT, manufactured by Asahi Kasei Corporation)
Load: 500 g (area of contact 50 mm×100 mm)
Moving direction: 20 mm
Moving rate: 100 mm/min
Test environment: 25° C., relative humidity 45%

Adhesive Properties

On the surface of a sample coating film, eleven cut lines were imparted lengthwise and crosswise with spaces of 1 mm by a razor to form 100 crosscut sections, and a commercially available cellophane tape (manufactured by NICHINBAN CO., LTD.) was intimately adhered and then rapidly pulled for peeling at an angle of 90°, whereby the number of crosscut sections where the coating film remained without being peeled is represented by the number.

Further, raw materials and the like used in Examples are shown below.

Raw Material Compounds

1) Polymerizable Monomer (A):
A-1: An acrylic urethane having a molecular weight of 2,300 and an average number of acryloyl groups per molecule of 15, obtained by reacting hydroxyl group-containing dipentaerythritol polyacrylate and hexamethylene diisocyanate.
A-2: Dipentaerythritol hexaacrylate.
A-3: Isobornyl acrylate.

2) Active energy ray polymerization initiator (C)
C-1: 2-Methyl-1-(4-metylthiophenyl)-2-morpholino-propan-1-one.

3) Colloidal silica (D)

D-1: Colloidal silica having a hydrolyzed condensate of a mercapto group-containing silane compound on its surface, obtained in such a manner that 2.5 parts by mass of 3-mercaptopropyltrimethoxysilane was added to 100 parts by mass of ethyl cellosolve dispersion type colloidal silica (silica content 30 mass %, average particle size 11 nm) and stirred at 80° C. in a stream of nitrogen for 5 hours under heating, followed by aging at room temperature for 12 hours.

D-2: Colloidal silica having a hydrolyzed condensate of a methacryloyl group-containing silane compound on its surface, obtained in such a manner that 2.5 parts by mass of 3-methacryloyloxypropyltrimethoxysilane was added to 100 parts by mass of propylene glycol monomethyl ether acetate dispersion type colloidal silica (silica content 30 mass %, average particle size 11 nm) and stirred at 50° C. for 3 hours, followed by aging at room temperature for 12 hours.

Water and Oil Repellency-Imparting agent (B-T)

The following number average molecular weight is a value measured by means of gel permeation chromatography employing polystyrene as a standard substance.

B-1: Into a 300 mL four-necked flask equipped with a stirrer and a condenser, 80 mg of titanium tetraisobutoxide, 100 g of $C_3F_7(OCF_2CF_2CF_2)_{20}O(CF_2)_2CH_2OH$ (DEMNUM SA, manufactured by DAIKIN INDUSTRIES, LTD, number average molecular weight 4,000) and 10 g of α-caprolactone were added and heated at 150° C. for 5 hours, to obtain a white waxy compound having ε-caprolactone added by ring-opening to one terminal of $C_3F_7(OCF_2CF_2CF_2)_{20}O(CF_2)_2CH_2OH$. The number average molecular weight was 4,400, and the degree of polymerization of caprolactone was about 3.5.

Then, the obtained compound was cooled to room temperature, 50 g of hexafluorometaxylene and 60 mg of 2,6-di-t-butyl-p-cresol were added thereto, followed by stirring for 30 minutes, and then 6.0 g of 2-methacryloyloxyethyl isocyanate was added thereto, followed by stirring at room temperature further for 24 hours, to obtain a hexafluorometaxylene solution (solid content 70 mass %) of a water and oil repellency-imparting agent (B-1) having its terminal modified with a methacryloyl group. The number average molecular weight of (B-1) was 4,550.

B-2: Into a 300 mL four-necked flask equipped with a stirrer, 100 g of the above $C_3F_7(OCF_2CF_2CF_2)_{20}O(CF_2)_2CH_2OH$, 50 mg of dibutyltin dilaurate and 250 mg of 2,6-di-t-butyl-p-cresol were added, followed by stirring at room temperature for 30 minutes, and then 3.6 g of 2-methacryloyloxyethyl isocyanate was added thereto, followed by stirring at room temperature further for 24 hours to obtain a water and oil repellency-imparting agent (B-2) having its terminal modified with a methacryloyl group. The number average molecular weight of (B-2) was 4,150.

B-3: Into a 300 mL four-necked flask equipped with a stirrer and a condenser, 600 mg of 2,2'-azobis(2-methylpropionitrile), 740 mg of n-dodecylmercaptan, 90 g of butyl acetate and 90 g of hexafluorometaxylene were added, followed by stirring at room temperature for 15 minutes, and then 45 g of the above water and oil repellency-imparting agent (B-2) and 15 g of a macromer having one terminal of polypropylene oxide modified with an acryloyl group (BLENMER AP-800 manufactured by NOF CORPORATION, $CH_2$=CHCOO—$(CH_2CH(CH_3)O)_y$—H, y≈13, hydroxyl value=66.8) were added thereto, followed by nitrogen purge, and then stirring was carried out at 70° C. for 18 hours to carry out polymerization, to obtain a reaction product.

As a result, a polymer having a number average molecular weight of 10,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 2.27 g of 2-methacryloyloxyethyl isocyanate was added thereto, followed by stirring at room temperature further for 24 hours, to obtain a butyl acetate solution (solid content concentration: about 25 mass %) of a water and oil repellency-imparting agent (B-3) having the polypropylene oxide terminal of the polymer units of the copolymer modified with a methacryloyl group. The number average molecular weight of (B-3) was 10,460.

B-4: Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 35 g of the above water and oil repellency-imparting agent (B-2), 20 g of stearyl acrylate and 5 g of 2-hydroxyethyl acrylate were added, followed by nitrogen purge, and then stirring was carried out at 70° C. for 18 chorus to carry out polymerization, to obtain a reaction product.

As a result, a polymer having a number average molecular weight of 25,000 was obtained. Then, the obtained reaction product was cooled to room temperature, 50 mg of dibutyltin dilaurate and 100 mg of 2,6-di-t-butyl-p-cresol were added, followed by stirring at room temperature for 30 minutes, and then 6.61 g of 2-methacryloyloxyethyl isocyanate was added thereto, followed by stirring at room temperature further for 24 hours, to obtain a butyl acetate solution (solid content concentration: about 25 mass %) of a water and oil repellency-imparting agent (B-4) having the 2-hydroxyethyl acrylate terminal of the polymer units of the copolymer modified with a methacryloyl group. The number average molecular weight of (B-4) was 27,800.

B-5: Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of the above water and oil repellency-imparting agent (B-2) and 15 g of unsaturated fatty acid hydroxyalkyl ester-modified ε-caprolactone (PLACCEL FA2D, manufactured by DAICEL CHEMICAL INDUSTRIES, LTD., degree of polymerization of caprolactone: 2) were added, followed by nitrogen purge, and then stirring was carried out at 70° C. for 18 hours to carry out polymerization, to obtain a reaction product.

As a result, a polymer having a number average molecular weight of 35,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 6.69 g of 2-methacryloyloxyethyl isocyanate was added thereto, followed by stirring at room temperature further for 24 hours, to obtain a butyl acetate solution (solid content concentration: about 25 mass %) of a water and oil repellency-imparting agent (B-5) having the unsaturated fatty acid hydroxyalkyl ester-modified ε-caprolactone terminal of the polymer units of the copolymer modified with a methacryloyl group. The number average molecular weight of (B-5) was 39,000.

B-6: The above water and oil repellency-imparting agent of $C_3F_7$ $(OCF_2CF_2CF_2)_{20}O(CF_2)_2CH_2OH$ having no active energy ray curable functional group (b-2) nor moiety (b-3).

B-7: Into a 300 mL four-necked flask equipped with a stirrer and a condenser, 80 mg of titanium tetraisobutoxide, 100 g of polyfluoropolyethylene oxide having hydroxyl groups on both terminals (tradename FOMBLIN Z-dol 1000, manufactured by Solvay Solexis K.K., $HOCH_2(CF_2CF_2O)_p$ $(CF_2O)_xCF_2CF_2CH_2OH$, average molecular weight 1,000) and 25 g of ε-caprolactone were added, followed by heating at 150° C. for 5 hours, to obtain a white waxy compound having ε-caprolactone added by ring-opening to both terminals of polyfluoropolyethylene oxide. The number average molecular weight was 1,250, and the degree of polymerization of caprolactone at each terminal was about 1.1

Then, the obtained compound was cooled to room temperature, 67 g of 1,3-bis(trifluoromethyl)benzene and 60 mg of 2,6-di-t-butyl-p-cresol were added thereto, followed by stirring at 30 minutes, and then 31.0 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure to obtain a water and oil repellency-imparting agent (B-7) having its terminal modified with a methacryloyl group. The number average molecular weight of (B-7) was 1,560.

Preparation of Compound M $(CF_3O(CF_2CF_2O)_p CF_2CH_2OH, p \approx 7.3)$ as a Raw Material of B-8 to B-13

In the following description, tetramethylsilane will be referred to as TMS, $CClF_2CF_2CHClF$ will be referred to as AK-225, and $CCl_2FCClF_2$ will be referred to as R113.

Step 1) Commercially available polyoxyethylene glycol monomethyl ether $(CH_3O(CH_2CH_2O)_{p+1}H, p \approx 7.3)$ (25 g), AK-225 (20 g), NaF (1.2 g) and pyridine (1.6 g) were put in a flask and vigorously stirred while keeping the internal temperature to at most 10° C., and nitrogen was bubbled. FCOCF $(CF_3)OCF_2CF(CF_3)OCF_2CF_2CF_3$ (46.6 g) was dropwise added thereto over a period of 3.0 hours while keeping the internal temperature to at most 5° C. After completion of the dropwise addition, stirring was carried out at 50° C. for 12 hours and then at room temperature for 24 hours, and the resulting crude liquid was recovered. The crude liquid was subjected to filtration under reduced pressure, and then the recovered liquid was dried in a vacuum dryer (50° C., 667 Pa) for 12 hours. The crude liquid thus obtained was dissolved in 100 ml of AK-225, washed with 1,000 ml of a saturated sodium bicarbonate aqueous solution three times, and the organic phase was recovered. Further, magnesium sulfate (1.0 g) was added to the recovered organic phase, followed by stirring for 12 hours. Then, pressure filtration was carried out to remove magnesium sulfate, and AK-225 was distilled off by an evaporator to obtain 56.1 g of a polymer which was liquid at room temperature. As a result of $^1$H-NMR and $^{19}$F-NMR analyses, the obtained polymer was confirmed to be a compound represented by $CH_3O(CH_2CH_2O)_{p+1}COCF(CF_3) OCF_2CF(CF_3)OCF_2CF_2CF_3$ (p is as defined above).

Step 2) R-113 (1,560 g) was added in a 500 mL autoclave made of hastelloy, stirred and kept at 25° C. At the autoclave gas outlet, a condenser kept at 20° C., a NaF pellet packed bed and a condenser kept at 20° C. were disposed in series. Here, a liquid return line to recover the condensed liquid to the autoclave was disposed to the condenser kept at −20° C. Nitrogen gas was blown for 1.0 hour, and then a fluorine gas diluted to 10% with a nitrogen gas (hereinafter referred to as 10% fluorine gas) was blown at a flow rate of 24.8 L/h for 1 hour.

Then, while blowing the 10% fluorine gas at the same flow rate, a solution having the product (27.5 g) obtained in Step 1 dissolved in R-113 (1,350 g) was injected over a period of 30 hours.

Then, while blowing the 10% fluorine gas at the same flow rate, 12 mL of an R-113 solution was injected. At that time, the internal temperature was changed to 40° C. Then, an R-113 solution (6 mL) having benzene dissolved at a concentration of 1 wt % was injected. Further, a fluorine gas was blown for 1.0 hour, and then a nitrogen gas was blown for 1.0 hour.

After completion of the reaction, the solvent was distilled off by vacuum drying (60° C., 6.0 hours) to obtain 45.4 g of a product which was liquid at room temperature. As a result of NMR analysis, the product was confirmed to be a compound represented by $CF_3O(CF_2CF_2O)_{p+1}COCF(CF_3)OCF_2CF (CF_3)OCF_2CF_2CF_3$ having 99.9% of the total number of hydrogen atoms in the product obtained in Step 1 substituted by fluorine atoms.

Step 3) The interior of a 300 mL round flask into which a stirrer chip was put, was sufficiently flushed with nitrogen. Methanol (36 g), NaF (5.6 g) and AK-225 (50 g) were added thereto, and the product (43.5 g) obtained in Step 2 was dropwise added thereto, followed by vigorous stirring while bubbling at room temperature. Nitrogen sealing was applied to the round flask outlet.

8 Hours later, excess methanol and reaction by-products were distilled off while keeping the interior of the system under reduced pressure by disposing a vacuum pump to the condenser. 24 Hours later, 26.8 g of a product which was liquid at room temperature was obtained.

As a result of analysis, it was confirmed that a compound represented by $CF_3O(CF_2CF_2O)_pCF_2COOCH_3$ having all the ester groups in the product obtained in Step 2 converted into methyl ester was the main product.

Step 4) The interior of a 300 mL round flask into which a stirrer chip was put, was sufficiently flushed with nitrogen. 2-Propanol (30 g), AK-225 (50.0 g) and $NaBH_4$ (4.1 g) were added, and the product (26.2 g) obtained in Step 3 was diluted with AK-225 (30 g) and dropwise added thereto. Then, vigorous stirring was carried out at room temperature, and nitrogen sealing was applied to the round flask outlet.

8 Hours later, the solvent was distilled off while keeping the interior of the system under reduced pressure by disposing a vacuum pump to the condenser. 24 Hours later, AK-225 (100 g) was put, and a 0.2N hydrochloric acid aqueous solution (500 g) was dropwise added thereto with stirring. After dropwise addition, stirring was continued for 6 hours. Then, the resulting organic phase was washed with distilled water (500 g) three times, and the organic phase was recovered by two-layer separation. Further, magnesium sulfate (1.0 g) was added to the recovered organic phase, followed by stirring for 12 hours. Then, pressure filtration was carried out to remove magnesium sulfate, and AK-225 was distilled off by an evaporator to obtain 24.8 g of a polymer which was liquid at room temperature.

As a result of analysis, it was confirmed that a compound represented by $CF_3O(CF_2CF_2O)_pCF_2CH_2OH$ having all the ester groups of the product obtained in Step 3 reduced was the main product.

B-8: Into a 300 mL four-necked flask equipped with a stirrer and a condenser, 80 mg of titanium tetraisobutoxide, 100 g of the compound M and 25 g of ε-caprolactone were added, followed by heating at 150° C. for 5 hours, to obtain a white waxy water and oil repellency-imparting agent (B-8) having ε-caprolactone added by ring-opening to the terminal of polyfluoropolyethylene oxide. The molecular weight of (B-8) was 1,250, and the degree of polymerization of caprolactone was about 2.2.

B-9: Into a 300 mL four-necked flask equipped with a stirrer and a condenser, 125 g of the water and oil repellency-imparting agent (B-8), 60 g of 1,3-bis(trifluoromethyl)benzene and 60 mg of 2,6-di-t-butyl-p-cresol were added, followed by stirring for 30 minutes, and then 15.5 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-9) having its terminal modified with a methacryloyl group. The molecular weight of (B-9) was 1,400.

B-10: Into a 300 mL four-necked flask equipped with a stirrer, 100 g of the compound M and 60 mg of 2,6-di-t-butyl-p-cresol were added, followed by stirring for 30 minutes, and then 31.0 g of 2-methacryloyloxyethyl isocyanate was added thereto, followed by stirring at room temperature further for 24 hours to obtain a water and oil repellency-imparting agent (B-10) having its terminal modified with a methacryloyl group. The number average molecular weight of (B-10) was 1,160.

B-11:: Into a 300 mL four-necked flask equipped with a stirrer and a condenser, 600 mg of 2,2'-azobis(2-methylpropionitrile), 740 mg of n-dodecylmercaptan, 90 g of butyl acetate and 90 g of 1,3-bis(trifluoromethyl)benzene were added, followed by stirring at room temperature for 15 minutes, and then 45 g of the above water and oil repellency-imparting agent (B-10) and 15 g of a macromer having one terminal of the polypropylene oxide denatured by an acryloyl group (BLENMER AP-800 manufactured by NOF CORPORATION, $CH_2=CHCOO-(CH_2CH(CH_3)O)_y-H$, $y \approx 13$, hydroxyl value: 66.8) were added thereto, followed by nitrogen purge, and then stirring was carried out at 70° C. for 18 hours to carry out polymerization, to obtain a reaction product.

As a result, a copolymer having a number average molecular weight of 10,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 2.27 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-11) having the polypropylene oxide terminal of the polymer units of the copolymer modified with a methacryloyl group. The number average molecular weight of (B-11) was 10,460.

B-12: Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of the above water and oil repellency-imparting agent (B-10) and 15 g of unsaturated fatty acid hydroxyalkyl ester-modified ε-caprolactone (PLACCEL FA2D, manufactured by DAICEL CHEMICAL INDUSTRIES, LTD., degree of polymerization of caprolactone:2) were added thereto, followed by nitrogen purge, and then stirring was carried out at 70° C. for 18 hours to carry out polymerization, to obtain a reaction product.

As a result, a copolymer having a number average molecular weight of 35,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 6.69 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-12) having the unsaturated fatty acid hydroxyalkyl ester modified ε-caprolactone terminal of the polymer units of the copolymer modified with a methacryloyl group. The number average molecular weight of (B-12) was 39,000.

B-13: Into a 300 mL four-necked flask equipped with a stirrer and a condenser, 580 mg of potassium fluoride, 100 g of the compound M and 9.12 g of ethylene carbonate were added, followed by heating for 40 hours with decarboxylation at 160° C., to obtain a colorless and transparent oily compound having one unit of ethylene oxide added to the terminal of the compound M.

Potassium fluoride in the system was separated by filtration, and then into the 300 mL four-necked flask equipped with a stirrer and a condenser, 80 mg of titanium tetraisobutoxide, 109 g of the above oily compound and 25 g of ε-caprolactone were added, followed by heating at 150° C. for 5 hours, to obtain a white waxy compound having ε-caprolactone added by ring-opening to the terminal of the compound M by means of one unit of ethylene oxide. The number average molecular weight was 1,400, and the degree of polymerization of caprolactone was about 2.2.

Then, 60 g of 1,3-bis(trifluoromethyl)benzene and 60 mg of 2,6-di-t-butyl-p-cresol were added thereto, followed by stirring for 30 minutes, and then 15.5 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure to obtain a water and oil repellency-imparting agent (B-13) having its terminal modified with a methacryloyl group. The number average molecular weight of (B-13) was 1,550.

B-14: Dimethylsilicone oil having part of its side chains substituted by a $C_8F_{17}CH_2CH_2$ group (tradename "FLS525", manufactured by Asahi Glass Company, Limited). A water and oil repellency-imparting agent having no functional group (b-2) nor moiety (b-3).

TABLE 1

| Water and oil repellency-imparting agent | Type | Structure |
| --- | --- | --- |
| B-1 | Straight chain type | $C_3F_7(OCF_2CF_2CF_2)_nO(CF_2)_2CH_2O-(C(=O)C_5H_{10}O)_t-CONHC_2H_4OCOC(CH_3)=CH_2$<br>$n \approx 20, t \approx 3.5$ |
| B-2 | No moiety (b-3) | $C_3F_7(OCF_2CF_2CF_2)_nO(CF_2)_2CH_2O-CONHC_2H_4OCOC(CH_3)=CH_2$<br>$n \approx 20, t \approx 3.5$ |
| B-3 | Copolymerization | $-[CH_2-C(CH_3)CO\{P\}]_f-[CH_2-CHCO\{Q\}]_g-$<br>$f \approx 1.8, g \approx 3.0$ |

TABLE 1-continued

| Water and oil repellency-imparting agent | Type | Structure |
|---|---|---|
| | type | {P}: $C_3F_7(OCF_2CF_2CF_2)_nO(CF_2)_2CH_2O$—$CONHC_2H_4O$— <br> {Q}: $CH_2$=$C(CH_3)COOC_2H_5NHCOO$—$(CH_2CH(CH_3)O)_y$— <br> n ≈ 20, y ≈ 13 |
| B-4 | Copolymer-ization type | —$[CH_2$—$C(CH_3)CO\{P\}]_f$—$[CH_2$—$CHCO\{Q\}]_g$-$[CH_2$—$CHCO\{R\}]_h$- <br> f ≈ 3.5, g ≈ 25.6, h ≈ 18.0 <br> {P}: $C_3F_7(OCF_2CF_2CF_2)_nO(CF_2)_2CH_2O$—$CONHC_2H_4O$— <br> {Q}: $C_{18}H_{37}O$— <br> {R}: $CH_2$=$C(CH_3)COOC_2H_5NHCOO$—$CH_2CH_2O$— <br> n ≈ 20 |
| B-5 | Copolymer-ization type | —$[CH_2$—$C(CH_3)CO\{P\}]_f$—$[CH_2$—$CHCO\{Q\}]_g$- <br> f ≈ 6.3, g ≈ 26.7 <br> {P}: $C_3F_7(OCF_2CF_2CF_2)_nO(CF_2)_2CH_2O$—$CONHC_2H_4O$— <br> {Q}: $CH_2$=$C(CH_3)COOC_2H_5NHCOO$—$(COC_5H_{10}$—$O)_x$—$C_2H_4O$— <br> n ≈ 20, x ≈ 2 |
| B-6 | No functional group (b-2) nor moiety (b-3) | $C_3F_7(OCF_2CF_2CF_2)_nO(CF_2)_2CH_2OH$ <br> n ≈ 20 |

TABLE 2

| Water and oil repellency-imparting agent | Type | Structure |
|---|---|---|
| B-7 | Straight chain type | $CH_2$=$C(CH_3)COOC_2H_4NHCOO$—$(C(=O)C_5H_{10}O)_t$—$CH_2(CF_2CF_2O)_p(CF_2O)_sCF_2CF_2CH_2O$—$(C(=O)C_5H_{10}O)_t$—$CONHC_2H_4OCOC(CH_3)$=$CH_2$ <br> t ≈ 1.1 |
| B-8 | No functional group (b-2) | $CF_3O(CF_2CF_2O)_pCF_2CH_2O$—$(C(=O)C_5H_{10}O)_t$—H <br> p ≈ 7.3, t ≈ 2.2 |
| B-9 | Straight chain type | $CF_3O(CF_2CF_2O)_pCF_2CH_2O$—$(C(=O)C_5H_{10}O)_t$—$CONHC_2H_4OCOC(CH_3)$=$CH_2$ <br> p ≈ 7.3, t ≈ 2.2 |
| B-10 | No moiety (b-3) | $CF_3O(CF_2CF_2O)_pCF_2CH_2O$—$CONHC_2H_4OCOC(CH_3)$=$CH_2$ <br> p ≈ 7.3 |
| B-11 | Copolymer-ization type | —$[CH_2$—$C(CH_3)CO\{P\}]_f$—$[CH_2$—$CHCO\{Q\}]$- <br> f ≈ 6.5, g ≈ 3.0 <br> {P}: $CF_3O(CF_2CF_2O)_pCF_2CH_2O$—$CONHC_2H_4O$— <br> {Q}: $CH_2$=$C(CH_3)COOC_2H_5NHCOO$—$(CH_2CH(CH_3)O)_y$— <br> p ≈ 7.3, y ≈ 13 |
| B-12 | Copolymer-ization type | —$[CH_2$—$C(CH_3)CO\{P\}]_f$—$[CH_2$—$CHCO\{Q\}]$- <br> f ≈ 22.6, g ≈ 26.7 <br> {P}: $CF_3O(CF_2CF_2O)_pCF_2CH_2O$—$CONHC_2H_4O$— <br> {Q}: $CH_2$=$C(CH_3)COOC_2H_5NHCOO$—$(COC_5H_{10}$—$O)_x$—$C_2H_4O$— <br> p ≈ 7.3, x ≈ 2 |
| B-13 | Straight chain type | $CF_3O(CF_2CF_2O)_pCF_2CH_2O$—$CH_2CH_2O$—$(C(=O)C_5H_{10}O)_t$—$CONHC_2H_4OCOC(CH_3)$=$CH_2$ <br> p ≈ 7.3, t ≈ 2.2 |

EXAMPLE 1

Into a 300 mL four-necked flask equipped with a stirrer and a condenser, 80 g of the polymerizable monomer (A-1), 1.0 g of the water and oil repellency-imparting agent (B-1), 4.0 g of the active energy ray polymerization initiator (C-1), 1.0 g of hydroquinone momomethyl ether as a thermal polymerization inhibitor, and 65.0 g of butyl acetate (AcBt) as an organic solvent were put and stirred for 1 hour at room temperature in a light shielding state for homogenization. Then, with stirring, 75.0 g of the colloidal silica (D-1) was slowly added, and further stirred for 1 hour at room temperature in a light shielding state for homogenization.

Then, 65.0 g of dibutyl ether (DBE) as an organic solvent was added thereto, followed by stirring for 1 hour at room temperature in a light shielding state to obtain a coating composition (Q1). Then, the coating composition (Q1) was spin coated (2000 rpm×10 seconds) on the surface of a substrate and dried in a circulating hot air oven at 90° C. for 1 minute, and then the coating film was cured by using a high-pressure mercury lamp (amount of light: 1,200 mJ/cm², integrated energy amount of ultraviolet rays in a wavelength region of from 300 to 390 nm). As a result, a sample 1 having a cured product layer (coating film) with a thickness of 1.2 μm formed on the substrate surface was obtained. Using this sample 1, measurements and evaluations were carried out with respect to the above-mentioned items. The results are shown in Table 4.

EXAMPLES 2 TO 9 AND 11 TO 19

Samples 2 to 9 and 11 to 19 were produced in the same manner as in Example 1 except that the types and amounts of the polymerizable monomer (A), the water and oil repellency-imparting agent (B), the active energy ray polymerization initiator (C), the colloidal silica (D) and the organic solvent in the coating composition of Example 1 were changed to the types and amounts (unit: g) as identified in Table 3, and the same measurements and evaluations as in Examples 1 were carried out.

EXAMPLE 10

Into a 300 mL four-necked flask equipped with a stirrer and a condenser, 80 g of the polymerizable monomer (A-1), 4.0 g of the active energy ray polymerization initiator (C-1), 1.0 g of hydroquinone momomethyl ether as a polymerization inhibitor, and 65.0 g of butyl acetate (AcBt) as an organic solvent were put and stirred for 1 hour at room temperature in a light shielding state for homogenization. Then, with stirring, 75.0 g of the colloidal silica (D-1) was slowly added, and further stirred for 1 hour at room temperature in a light shielding state for homogenization.

Then, 65.0 g of dibutyl ether (DBE) as an organic solvent was added thereto, followed by stirring for 1 hour at room temperature in a light shielding state to obtain a coating composition (Q10). Then, the coating composition (Q10) was spin coated (2000 rpm×10 seconds) on the surface of a substrate and dried in a circulating hot air oven at 90° C. for 1 minute, and then the coating film was cured by using a high-pressure mercury lamp (amount of light: 1,200 mJ/cm², integrated energy amount of ultraviolet rays in a wavelength region of from 300 to 390 nm) to form a cured product layer with a thickness of 1.2 μm formed by curing the polymerizable monomer (A-1) on the substrate surface.

Then, 1.0 g of the water and oil repellency-imparting agent (B-1) was dissolved in acetone, and the obtained acetone solution of (B-1) was spin-coated (2,000 rpm×10 seconds) on the surface of the above cured product layer and dried in a circulating hot air oven at 90° C. for 1 minute, and the coating film was cured by using a high-pressure mercury lamp (amount of light: 1,200 mJ/cm², integrated energy amount of ultraviolet rays in a wavelength region of from 300 to 390 nm), to form a thin cured product layer of the water and oil repellency-imparting agent (B-1). As a result, a sample 10 having a cured product layer with a thickness of 1.2 μm formed by curing the polymerizable monomer (A-1) formed on the substrate surface and having a thin cured product layer of the water and oil repellency-imparting agent (B-1) formed on the surface of the cured product layer, was obtained. Using the sample 10, the same measurements and evaluations as in Example 1 were carried out.

TABLE 3

|        | A                  | B         | C        | D          | AcBt   | DBE    |
|--------|--------------------|-----------|----------|------------|--------|--------|
| Ex. 1  | A-1:80 g           | B-1:1.0 g | C-1:4.0 g | D-1:75.0 g | 65.0 g | 65.0 g |
| Ex. 2  | A-2:80 g           | B-1:1.0 g | C-1:4.0 g | D-1:75.0 g | 65.0 g | 65.0 g |
| Ex. 3  | A-1:50 g A-2:30 g  | B-1:1.0 g | C-1:4.0 g | D-1:75.0 g | 65.0 g | 65.0 g |
| Ex. 4  | A-2:80 g           | B-2:1.0 g | C-1:4.0 g | D-1:75.0 g | 65.0 g | 65.0 g |
| Ex. 5  | A-2:80 g           | B-3:1.0 g | C-1:4.0 g | D-1:75.0 g | 65.0 g | 65.0 g |
| Ex. 6  | A-2:80 g           | B-4:1.0 g | C-1:4.0 g | D-1:75.0 g | 65.0 g | 65.0 g |
| Ex. 7  | A-2:80 g           | B-5:1.0 g | C-1:4.0 g | D-1:75.0 g | 65.0 g | 65.0 g |
| Ex. 8  | A-2:50 g A-3:30 g  | B-1:1.0 g | C-1:4.0 g | Nil        | 65.0 g | 65.0 g |
| Ex. 9  | A-1:80 g           | B-6:1.0 g | C-1:4.0 g | D-1:75.0 g | 65.0 g | 65.0 g |
| Ex. 10 | A-1:80 g           | B-1:1.0 g | C-1:4.0 g | D-1:75.0 g | 65.0 g | 65.0 g |
| Ex. 11 | A-2:80 g           | B-7:0.3 g | C-1:4.0 g | D-1:75.0 g | 65.0 g | 65.0 g |
| Ex. 12 | A-2:80 g           | B-8:0.3 g | C-1:4.0 g | D-1:75.0 g | 65.0 g | 65.0 g |
| Ex. 13 | A-2:80 g           | B-9:0.3 g | C-1:4.0 g | D-1:75.0 g | 65.0 g | 65.0 g |
| Ex. 14 | A-1:60 g A-3:20 g  | B-10:0.8 g | C-1:4.0 g | D-1:75.0 g | 65.0 g | 65.0 g |
| Ex. 15 | A-1:60 g A-3:20 g  | B-11:0.8 g | C-1:4.0 g | D-1:75.0 g | 65.0 g | 65.0 g |
| Ex. 16 | A-1:60 g A-3:20 g  | B-12:0.8 g | C-1:4.0 g | D-1:75.0 g | 65.0 g | 65.0 g |
| Ex. 17 | A-2:80 g           | B-13:0.3 g | C-1:4.0 g | D-1:75.0 g | 65.0 g | 65.0 g |
| Ex. 18 | A-2:80 g           | B-13:0.3 g | C-1:4.0 g | D-2:75.0 g | 65.0 g | 65.0 g |
| Ex. 19 | A-1:60 g A-3:20 g  | B-14:0.8 g | C-1:4.0 g | D-1:75.0 g | 65.0 g | 65.0 g |

In Example 10, a cured product layer of B was formed on a cured coating film containing A, C and D.

TABLE 4

| | Contact angle Distilled water/oleic acid | | Transparency (haze, %) | Abrasion resistance (%) | Adhesive properties (number) | Fingerprint removability | | Surface lubricity | |
|---|---|---|---|---|---|---|---|---|---|
| | Initial | After moisture resistance test | | | | Initial | After moisture resistance test | Initial | After moisture resistance test |
| Ex. 1 | 110/76 | 105/75 | 0.3 | 3.5 | 100 | ○ | ○ | 0.08 | 0.08 |
| Ex. 2 | 112/73 | 107/72 | 0.3 | 2.8 | 100 | ○ | ○ | 0.09 | 0.09 |
| Ex. 3 | 110/74 | 105/74 | 0.2 | 3.0 | 100 | ○ | ○ | 0.09 | 0.09 |
| Ex. 4 | 103/74 | 101/71 | 3.6 | 2.7 | 100 | ○ | ○ | 0.08 | 0.15 |
| Ex. 5 | 111/75 | 107/74 | 0.2 | 2.9 | 100 | ○ | ○ | 0.09 | 0.09 |
| Ex. 6 | 108/75 | 102/75 | 0.2 | 2.6 | 100 | ○ | ○ | 0.09 | 0.09 |
| Ex. 7 | 107/74 | 103/73 | 0.1 | 2.4 | 100 | ○ | ○ | 0.09 | 0.09 |
| Ex. 8 | 109/73 | 104/70 | 0.2 | 9.5 | 100 | ○ | ○ | 0.09 | 0.09 |
| Ex. 9 | 109/70* | 65/35 | 5.5 | 3.5 | 100 | ○ | X | 0.07 | 0.6 |
| Ex. 10 | 111/75 | 70/40 | 0.6 | 4.0 | 100 | ○ | X | 0.07 | 0.5 |
| Ex. 11 | 112/77 | 106/72 | 0.3 | 2.8 | 100 | ○ | ○ | 0.07 | 0.07 |
| Ex. 12 | 109/71 | 70/45 | 0.3 | 2.9 | 100 | ○ | ○ | 0.07 | 0.5 |
| Ex. 13 | 113/78 | 111/77 | 0.3 | 3.0 | 100 | ○ | ○ | 0.06 | 0.06 |
| Ex. 14 | 100/70 | 98/68 | 8.5 | 3.5 | 100 | ○ | ○ | 0.08 | 0.16 |
| Ex. 15 | 108/72 | 106/71 | 0.3 | 5.2 | 100 | ○ | ○ | 0.07 | 0.07 |
| Ex. 16 | 109/74 | 107/72 | 0.3 | 6.0 | 100 | ○ | ○ | 0.07 | 0.07 |
| Ex. 17 | 108/71 | 107/70 | 0.2 | 2.9 | 100 | ○ | ○ | 0.05 | 0.05 |
| Ex. 18 | 108/72 | 107/71 | 0.2 | 2.8 | 100 | ○ | ○ | 0.05 | 0.05 |
| Ex. 19 | 103/55 | 60/30 | 0.6 | 1.3 | 100 | X | X | 0.3 | 0.4 |

*Repellency observed on the film surface.

A molded product comprising a glass or plastic substrate and a coating film made of a cured product of the coating composition of the present invention formed on the surface of the substrate, is excellent in stain resistance, particularly in stain resistance against grease stains such as fingerprints, sebum, sweat and cosmetics, and such grease stains are less likely to be attached to the molded product, and even when attached, they can easily be wiped off. Further, the molded product is excellent also in abrasion resistance and transparency. Accordingly, the molded product is preferred as an optical member such as an antireflection film, an optical filter, an optical lens, a liquid crystal display, an EL display and an optical disk, to which attachment of grease stains is problematic in appearance.

The entire disclosures of Japanese Patent Application No. 2002-329119 filed on Nov. 13, 2002, Japanese Patent Application No. 2002-340502 filed on Nov. 25, 2002 and Japanese Patent Application No. 2003-94994 filed on Mar. 31, 2003 including specifications, claims and summaries are incorporated herein by reference in their entireties.

What is claimed is:

1. An active energy ray curable coating composition comprising 100 parts by mass of an active energy ray curable polymerizable monomer (A), from 0.01 to 10 parts by mass of a water and oil repellency-imparting agent (B) and from 0.1 to 10 parts by mass of an active energy ray polymerization initiator (C), wherein the polymerizable monomer (A) contains at least 20 mass% of a polyfunctional polymerizable monomer (a-1) having at least two polymerizable functional groups selected from the group consisting of an acryloy group and a methacryloyl group in one molecule, in the total mass of the polerizable monomer (A) contained in the coating composition, and the water and oil repellency-imparting agent (B) contains a water and oil repellency-imparting agent (B-T) having a moiety (b-1) exerting water and oil repellency and which contains at least one portion selected from the group consisting of portions represented by the following formulae (6) to (8):

  Formula (6)

$$-(CF_2CF_2O)_p-$$

  Formula (7)

$$-(CF_2CF(CF_3)O)_q-$$

  Formula (8)

$$(CF_2CF_2CF_2O)_r-$$

wherein each of p, q and r is an integer of from 1 to 100, an active energy ray curable functional group (b-2) and a moiety (b-3) made of at least one portion selected from the group consisting of portions represented by the following formulae (2) to (4):

  Formula (2)

$$-(CH_2CH_2O)_x-$$

  Formula (3)

$$-(CH_2CH(CH_3)O)_y-$$

  Formula (4)

$$-(C(=O)C_uH_{2u}O)_t-$$

wherein, each of x and y is an integer of from 5 to 100, u is an integer of from 3 to 5, and t is an integer of from 1 to 20, and in the water and oil repellency-imparting agent (B-T), the moiety (b-1), the moiety (b-3) and the functional group (b-2) are linearly connected.

2. The coating composition according to claim 1, which further contains from 0.1 to 500 parts by mass of a colloidal silica (D) per 100 parts by mass of the polymerizable monomer (A).

3. The coating composition according to claim 2, wherein the colloidal silica (D) is a modified colloidal silica obtained by surface modification with a mercapto group-containing silane compound (S1) wherein an organic group having a mercapto group, and a hydrolysable group or a hydroxyl group, are bonded to a silicon atom.

4. The coating composition according to claim 3, wherein the mercapto group-containing silane compound (S1) is a compound represented by the following formula (12):

$$HS-R^1-SiR^2_f R^5_{3-f} \quad \text{Formula (12)}$$

wherein $R^1$ is a bivalent hydrocarbon group, $R^2$ is a hydroxyl group or a hydrolysable group, $R^5$ is a monovalent hydrocarbon group, and f is an integer of from 1 to 3.

5. The coating composition according to claim 2, wherein the colloidal silica (D) is a modified colloidal silica obtained by surface modification with a (meth)acryloyl group-containing silane compound (S2) wherein an organic group having a (meth)acryloyl group, and a hydrolysable group or a hydroxyl group, are bonded to a silicon atom.

6. The coating composition according to claim 5, wherein the (meth)acryloyl group-containing silane compound (S2) is a compound represented by the following formula (13):

$$CH_2=C(R^6)-R^7-SiR^2_f R^5_{3-f} \quad \text{Formula (13)}$$

wherein $R^6$ is a hydrogen atom or a methyl group, $R^7$ is a bivalent hydrocarbon group, $R^2$ is a hydroxyl group or a hydrolysable group, $R^5$ is a monovalent hydrocarbon group, and f is an integer of from 1 to 3.

7. The coating composition according to claim 1, which forms a coating film by curing, wherein the contact angle relative to oleic acid on the surface of the coating film after curing is at least 60 degree initially and at least 55 degree after a moisture resistance test, the haze of the coating film after curing is at most 3%, and the change in the haze of the coating film after curing between before and after Taber abrasion test (abrasive wheels: CS-10F, load on one wheel: 500g, 500 cycles) as defined by ISO9352 is at most 10%.

8. A molded product which comprises a glass or plastic substrate and a coating film with a thickness of from 0.1 μm to 50 μm, made of a cured product of the coating composition as defined in claim 1, formed on the surface of the substrate.

9. The coating composition according to claim 1, wherein the water and oil repellency-imparting agent (B-T) has such a structure as is obtained by polymerizing ethylene oxide, propylene oxide or lactone to the terminal hydroxyl group of a compound having the moiety (b-1) and having its terminal modified with a hydroxyl group.

10. The coating composition according to claim 1, wherein the water and oil repellency-imparting agent (B-T) is represented by the following formula:

$$CF_3O(CF_2CF_2O)_p CF_2 CH_2O-CH_2CH_2O-(C(=O)C_5H_{10}O)_t-CONHC_2H_4OCOC(CH_3)=CH_2,$$

wherein p is an integer of from 1 to 100, and t is an integer of from 1 to 20.

11. The coating composition according to claim 9, wherein in the water and oil repellency-imparting agent (B-T), the moiety (b-1) exerting water and oil repellency has a portion represented by the following formula (10) or (11):

$$R^f(OC_3F_6)_n-O-(CF_2)_m-(CH_2)_L-O- \quad \text{Formula (10)}$$

wherein $R^f$ is a $C_{1-16}$ polyfluoroalkyl group (including one having an oxygen atom), n is an integer of from 1 to 50, each of m and L is an integer of from 0 to 3, and 6 ≧ m+L>0, $$R^f(OC_2F_4)_e-O-(CF_2)_g-(CH_2)_h-O- \quad \text{formula (11)}$$

wherein $R^f$ is a $C_{1-16}$ polyfluoroalkyl group (including one having an oxygen atom), e is an integer of from 1 to 50, each of g and h is an integer of from 0 to 3, and 6 ≧ g+h>0.

* * * * *